United States Patent
Branch et al.

(10) Patent No.: US 12,320,244 B2
(45) Date of Patent: Jun. 3, 2025

(54) METHODS AND SYSTEMS FOR STORING HYDROGEN IN A SALT CAVERN

(71) Applicant: NeuVentus, LLC, Greenwich, CT (US)

(72) Inventors: David Sean Branch, Houston, TX (US); Diego Miguel Rubio, Austin, TX (US); Samuel William Porter, Austin, TX (US)

(73) Assignee: NeuVentus, LLC, Greenwich, CT (US)

( * ) Notice: Subject to any disclaimer, the term of this patent is extended or adjusted under 35 U.S.C. 154(b) by 0 days.

(21) Appl. No.: 18/882,618

(22) Filed: Sep. 11, 2024

(65) Prior Publication Data

US 2025/0092773 A1 Mar. 20, 2025

Related U.S. Application Data

(60) Provisional application No. 63/582,825, filed on Sep. 14, 2023.

(51) Int. Cl.
| | | |
|---|---|---|
| *E21B 43/28* | (2006.01) | |
| *B65G 5/00* | (2006.01) | |
| *E21B 49/02* | (2006.01) | |
| *E21B 17/14* | (2006.01) | |

(52) U.S. Cl.
CPC ............ *E21B 43/28* (2013.01); *B65G 5/00* (2013.01); *E21B 49/02* (2013.01); *E21B 17/14* (2013.01)

(58) Field of Classification Search
CPC . B65G 5/00; E21B 43/28; E21B 49/02; E21B 17/14; E21D 13/00
See application file for complete search history.

(56) References Cited

U.S. PATENT DOCUMENTS

| | | | |
|---|---|---|---|
| 5,511,905 A | * | 4/1996 | Bishop .................... B65G 5/00 |
| | | | 166/57 |
| 7,078,011 B2 | | 7/2006 | Morrow et al. |
| 8,425,149 B2 | | 4/2013 | Drnevich |
| 8,690,476 B2 | | 4/2014 | Oates |
| 8,757,926 B2 | | 6/2014 | Drnevich |
| 8,950,419 B2 | | 2/2015 | Oates et al. |
| 9,278,807 B2 | | 3/2016 | Drnevich |
| 9,284,120 B2 | | 3/2016 | Oates |
| 9,365,349 B1 | | 6/2016 | Strybos |
| 9,482,654 B1 | | 11/2016 | Strybos |
| 9,573,762 B2 | | 2/2017 | Strybos |
| 9,656,807 B2 | | 5/2017 | Strybos et al. |

(Continued)

OTHER PUBLICATIONS

Schlichtenmayer, et al., "Renewable Energy Storage in Salt Caverns—A Comparison of Thermodynamics and Permeability between Natural Gas, Air and Hydrogen", Solution Mining Research Institute, May 2015, 90 pages.

(Continued)

*Primary Examiner* — Carib A Oquendo
(74) *Attorney, Agent, or Firm* — Patterson + Sheridan, LLP

(57) ABSTRACT

Methods and systems for storing hydrogen in a salt cavern are provided. Particularly, the storage processes involve: placing the storage facility into service and subsequently creating additional cavern capacity; using hydrogen as a protective blanket during solution mining; using a predetermined cylindrical region within the salt formation as a sufficiently impermeable barrier; and maintaining cavern integrity by maintaining a predetermined quantity of hydrogen within the predetermined cylindrical region.

25 Claims, 9 Drawing Sheets

(56) References Cited

U.S. PATENT DOCUMENTS

| | | |
|---|---|---|
| 9,718,618 B2 | 8/2017 | Oates |
| 9,950,927 B2 | 4/2018 | Oates et al. |
| 10,017,324 B2 | 7/2018 | Drnevich |
| 10,173,840 B2 | 1/2019 | Oates |
| 10,215,024 B1 | 2/2019 | Ellerbusch |
| 10,221,689 B1 | 3/2019 | Ellerbusch |
| 10,315,846 B2 | 6/2019 | Oates |
| 11,167,927 B1 | 11/2021 | Ellerbusch |
| 11,180,318 B1 | 11/2021 | Ellerbusch |
| 11,655,682 B2 | 5/2023 | Hilhorst et al. |
| 2016/0138377 A1 | 5/2016 | Strybos |
| 2016/0138379 A1 | 5/2016 | Strybos |
| 2016/0160626 A1 | 6/2016 | Strybos |
| 2016/0160644 A1 | 6/2016 | Strybos |
| 2023/0203918 A1* | 6/2023 | Poiate Junior .......... E21B 49/00 166/250.01 |

OTHER PUBLICATIONS

Réveillère, et al., "Enabling Large-Scale Hydrogen Storage in Salt Caverns: Recent Developments", Solution Mining Research Institute, May 2022, 27 pages.

Buzogany, et al. "Hydrogen Storage in Salt Caverns Current Status and Potential Future Research Topics", Solution Mining Research Institute, Apr. 17, 2023, 110 pages.

* cited by examiner

METHODS AND SYSTEMS FOR STORING HYDROGEN IN A SALT CAVERN

CROSS-REFERENCE TO RELATED APPLICATIONS

The present application claims priority to and the benefit of U.S. Provisional Application No. 63/582,825, filed Sep. 14, 2023, the entirety of which is incorporated by reference herein.

BACKGROUND

The United States currently produces approximately 10 million metric tons of hydrogen per year and consumes such hydrogen primarily for use cases relating to petroleum refining, ammonia production, and chemical production. Although many of the hydrogen production facilities are co-located at the point of consumption, a significant portion are not. As a result, the United States currently has approximately 1,600 miles of dedicated hydrogen pipeline and three salt cavern hydrogen storage facilities. The existing hydrogen infrastructure is geographically concentrated along the Gulf Coast in Texas and Louisiana. None of the existing hydrogen pipeline and salt cavern storage infrastructure is operated as a public system that would allow unaffiliated third parties to take capacity and flow or store hydrogen. Instead, the existing hydrogen pipeline and salt cavern storage infrastructure is operated as a private system that is owned and controlled in most cases by a producer of hydrogen and in some instances by a consumer of hydrogen.

In November 2021, the Infrastructure Investment and Jobs Act (Public Law 117-58), also known as the Bipartisan Infrastructure Law, was passed and signed into law and included $9.5 billion in appropriations for clean hydrogen. In August 2022, the Inflation Reduction Act (Public Law 117-169), also known as the IRA, was passed and signed into law and included significant production tax credits for clean hydrogen and investment tax credits for hydrogen storage facilities. Due in part to these significant federal investments and incentives, the Department of Energy believes that clean hydrogen demand in the United States could reach 50 million metric tons by 2050. Given the expected growth in hydrogen production and consumption, a commensurately significant buildout of hydrogen pipelines and storage facilities is also anticipated.

With a boiling point of −423° F., storing hydrogen in liquid form at scale is prohibitively expensive. At present, underground salt cavern storage is the only proven method for storing large quantities of hydrogen in gaseous form. Salt caverns are generally formed by solution mining. Solution mining involves injecting water through pipes underground into a naturally occurring geologic formation of salt. The water dissolves the salt, thereby creating brine. The resultant brine is returned to surface through the pipes, leaving a void in the salt formation that acts as an underground storage container. The solution mining process can often take several years to complete. Specifically with respect to hydrogen salt cavern solution mining, the void space is created before the cavern is placed into commercial hydrogen storage service, and once placed into service the intentional creation of additional storage capacity through solution mining is ceased. In other words, hydrogen is not introduced into conventional salt caverns for storage until the solution mining of the entire cavern volume has been completed. As a result, the process by which hydrogen salt cavern storage facilities heretofore have been developed and created is lengthy, inflexible, and not conducive to rapidly evolving hydrogen market dynamics. Thus, there is a need in the art to store hydrogen gas in a salt cavern that can be expanded in size after the cavern is put into hydrogen storage service.

Furthermore, hydrogen salt cavern storage practices to date have relied upon the relatively consistent and uniform geological characteristics of the salt dome formations that naturally occur along the Gulf Coast of the United States. For example, three of the four currently-existing and operational hydrogen salt cavern storage facilities worldwide are located in salt domes in Texas. Gulf Coast salt domes have high halite concentrations with low structural permeability to gases, making them uniquely suitable for underground salt cavern storage of gases. Hydrogen salt cavern storage facilities have heretofore relied upon forming and maintaining a substantially impermeable barrier or a fundamentally impervious boundary along the walls inside the salt cavern when hydrogen is introduced into the salt cavern to retain the hydrogen within the salt cavern. In other words, the pressure within the cavern has to be above a lower pressure limit that forms the barrier or boundary and below an upper pressure limit (e.g., pressure based on shoe depth) dictated by a regulatory agency. As a result, the locations in which hydrogen salt cavern storage facilities have been sited and developed have been geologically and geographically limited and not conducive to a rapidly expanding national hydrogen ecosystem. Therefore, there is a need in the art for a method of creating a salt cavern suitable for hydrogen storage that is not geologically and geographically limited to the Gulf Coast. Additionally, there is a need in the art for a salt cavern that relies upon the natural impermeability of the salt formation to retain the hydrogen rather than the formation and maintenance of a barrier or boundary along the walls of the salt cavern, while accounting for some level of permeability into the region of the salt immediately adjacent to the salt cavern.

SUMMARY

The present disclosure generally relates to the creation and operation of salt caverns for the storage of hydrogen for subsequent production. In one aspect, a method of operating a cavern in a salt formation includes performing a first mining operation to expand the cavern from a first volume to a second volume. The first mining operation includes injecting a first solvent into a first inlet of a wellhead and through a first flow path of a tubular string to dissolve a first portion of the salt formation to form a first brine; and pumping the first brine out a first outlet of the wellhead via a second flow path of the tubular string. The method further includes performing a mechanical integrity test of the cavern after performing the first mining operation. The method further includes injecting a predetermined quantity of hydrogen gas into the cavern after performing the mechanical integrity test.

In another aspect, a method of operating a cavern in a salt formation includes performing a first mining operation to expand the cavern from a first volume to a second volume. The first mining operation includes injecting a first solvent into a first inlet of a wellhead and through a first flow path of a tubular string to dissolve a first portion of a salt formation to form a first brine, and pumping the first brine out a first outlet of the wellhead via a second flow path of the tubular string. The method further includes maintaining a first blanket within the cavern during the first mining operation by injecting a first gas into the cavern. The method further includes performing a mechanical integrity test of the cavern after performing the first mining operation, and performing a second mining operation to expand the cavern from the second volume to a third volume by mining the cavern. The second mining operation includes injecting a second solvent into the cavern to dissolve a second portion of the salt formation to form a second brine, and pumping the second brine out of the cavern via the second flow path. The method further includes maintaining a hydrogen blanket within the cavern during the second mining operation by injecting hydrogen gas into the cavern through a second inlet in the wellhead and into a third flow path of the tubular string.

In another aspect, a method of operating a salt cavern includes estimating a deformation of the salt cavern caused by removing a portion of a hydrogen gas disposed within the salt cavern to reduce a pressure of the hydrogen gas within the salt cavern from a first pressure to a second pressure. The method further includes comparing the estimated deformation to a deformation threshold, and determining that the estimated deformation does not exceed the deformation threshold. The method further includes removing, for a first time, the portion of the hydrogen gas from the salt cavern after determining that the estimated deformation does not exceed the deformation threshold.

In another aspect, a salt cavern system includes a wellhead and a cavern formed within a salt formation, the cavern including a neck. The salt cavern system further includes a string assembly connecting the cavern to the wellhead. The string assembly includes a first casing string having a first casing shoe set in the salt formation, and a second casing string disposed in the first casing string. The second casing string has a second casing shoe set in the salt formation downhole of the first casing shoe. The string assembly further includes a third casing string disposed in the second casing string. The third casing string has a third casing shoe set in the salt formation downhole of the second casing shoe. The third casing shoe defines an opening in the neck.

BRIEF DESCRIPTION OF THE DRAWINGS

The objectives and advantages of the disclosed technology will be better understood from the following detailed description of the preferred embodiments thereof in connection with the accompanying figures wherein like numbers denote same features throughout and wherein.

DETAILED DESCRIPTION

Figure 1:
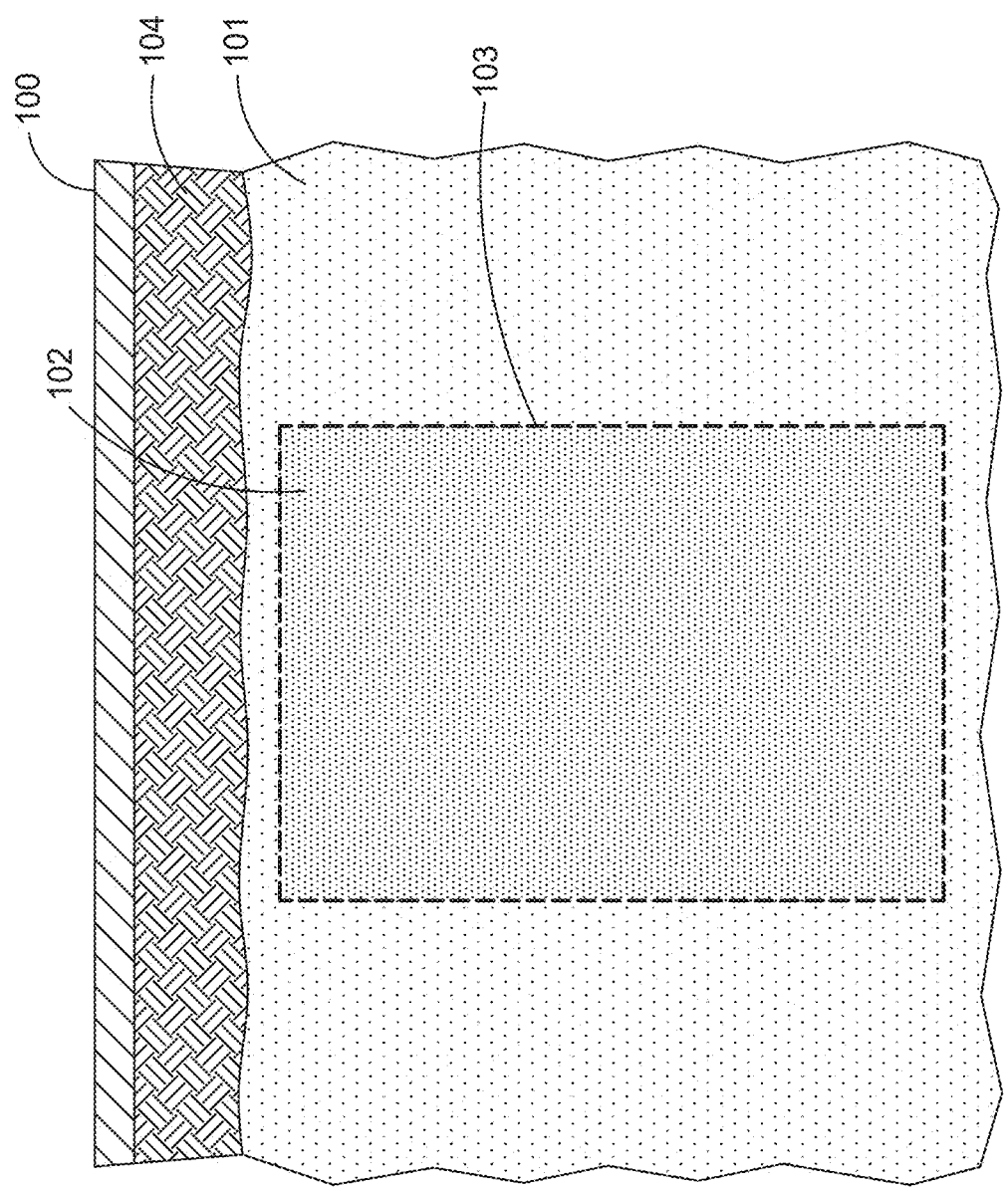
FIG. 1 shows a predetermined cylindrical region within a salt formation, within which a cavern will be formed.

The present disclosure describes improvements upon the existing technology by allowing a cavern, such as a salt cavern, to be placed into hydrogen storage service before the solution mining process is complete. Placing the hydrogen storage facility into commercial service before the solution mining process is complete has significant advantages because it accelerates development timelines for new hydrogen storage facilities, enables the hydrogen storage facility to be placed into service more quickly and allows ultimate capacity to be determined during rather than prior to construction.

As will also be discussed, the present disclosure describes improvements upon the existing technology by using hydrogen as a protective blanket during the solution mining process. The operator can rely upon the hydrogen blanket in the upper regions of the cavern to protect the sensitive areas of the cavern along the roof, neck, and casing shoe from interaction with the solvent brine while continuing to create additional hydrogen storage capacity through ongoing solution mining in the lower regions of the cavern. Additionally, the hydrogen blanket protects the upper regions of the cavern from collapse. In other words, the hydrogen blanket prevents or substantially prevents the salt from creeping in on itself during the formation of the cavern. Storage facility operators can dynamically increase storage capacity as needed in response to rapidly evolving hydrogen market conditions, even after hydrogen storage operations have commenced. In some embodiments, hydrogen may be used as the blanket material throughout the entire solution mining process. In some embodiments, however, another gaseous blanket material, such as nitrogen gas, may be used as the blanket until the cavern reaches a minimum viable cavern size for hydrogen storage. Once the minimum viable cavern size is reached, then hydrogen is used as the blanket material to facilitate further solution mining to expand the cavern size and to facilitate the commercial storage of hydrogen gas within the cavern.

Furthermore, the present disclosure describes improvements upon the existing technology by expanding the range of geologies and geographies that might be suitable for underground hydrogen storage within a cavern, such as a salt cavern. Conventional salt caverns require maintaining a pressure within the cavern to form a substantially impermeable barrier or fundamentally impervious boundary along the inner wall of the cavern to keep the hydrogen within the cavern. In other words, conventional salt caverns require manipulating the pressure within the salt cavern to close the pores and voids in the surrounding salt to hold the hydrogen within the cavern. By defining a cylindrical region within a salt formation, and taking into account the porosity and/or permeability of the salt contained within that cylindrical region, hydrogen salt cavern storage developers are not required to maintain a minimum pressure of the hydrogen within the cavern to form a substantially impermeable barrier or fundamentally impervious boundary to retain the hydrogen. Rather, the cavern is designed to leverage the permeability of the salt within the predetermined cylindrical region and the impermeability of the salt beyond the predetermined cylindrical region to retain the hydrogen within the cylindrical region in a manner that will prevent waste of the stored hydrogen, prevent uncontrolled escape of the hydrogen, prevent pollution of fresh water, and prevent danger to life or property. By relying upon the existing characteristics of the geological salt formation to establish sufficient impermeability as opposed to needing to create or form a barrier or boundary within the cavern itself or along its interior walls, some theoretical seepage of hydrogen into the formation can be tolerated so long as the cavern can be operated safely. In other words, some hydrogen will permeate into the salt in the predetermined cylindrical region, but the impermeability of the salt beyond the predetermined cylindrical region will contain the hydrogen to facilitate hydrogen storage within the cavern.

Furthermore, and as will also be discussed, the present disclosure contemplates embodiments where salt cavern storage developers can advantageously rely upon the existing geostatic and lithostatic pressures on the predetermined cylindrical region together with the permeability of the salt structure contained within such cylindrical region to determine a minimum quantity (e.g., amount) of hydrogen that must be injected into the cavern to maintain the hydrogen blanket. In some embodiments, the minimum quantity of hydrogen is a minimum volume of hydrogen that needs to be injected into the system through the wellhead to maintain the hydrogen blanket. In some embodiments, the minimum quantity of hydrogen is a minimum mass of hydrogen that needs to be injected into the system through the wellhead.

By maintaining a minimum quantity of hydrogen within the predetermined cylindrical region rather than maintaining the stored hydrogen at a pressure above a lower limit within the cavern to form the impermeable barrier or impervious boundary, cavern storage facility operators are able to maintain the structural integrity of a broader range of geologic salt formations in further support of a rapidly expanding national hydrogen ecosystem. Furthermore, more hydrogen can be removed from the cavern for commercial purposes sooner than with conventional caverns since the pressure associated with the impermeable barrier is not a consideration. Taken together, the present disclosure discloses embodiments of forming caverns, such as salt caverns, that can be formed to store hydrogen in a broader range of suitable geological salt formations to meet the needs of a rapidly expanding national hydrogen ecosystem.

Hydrogen is extracted from the cavern based on the pressure difference between the cavern pressure and the wellhead outlet pressure. In some embodiments, the cavern may be formed in a salt formation with sufficient structural integrity to facilitate rapid depressurization of the cavern to meet market demand. The cavern may, over the course of one or more days, be emptied of hydrogen gas to a level that is below the minimum quantity of hydrogen. For example the cavern can, over the course of one or more days, be depressurized to 0 psig or close to 0 psig (e.g., such as being less than 10 psig). In other words, the cavern, depending on the salt properties, can be substantially emptied of hydrogen (e.g., emptied until the pressure differential between the cavern and the wellhead no longer results in hydrogen gas flow). However, the flow rate of hydrogen out of the cavern decreases over time as the pressure differential diminishes. Thus, the cavern may, over the course of one or more days, be emptied until the flow rate diminishes to an undesirable level. For example, the cavern may be emptied until a gauge pressure measured reaches about 100 psig. Without being bound by theory, it is believed that the salt formation can undergo one or more cycles of rapid depressurization without sustaining long term structural damage and can be repeatedly refilled with hydrogen without substantial loss in storage volume. However, repeated cycles of rapid depressurization can cause irreversible shrinkage in cavern size. In some embodiments, the structural integrity of the cavern is assessed after one or more cycles to determine if further rapid depressurization can be done without compromising the integrity of the cavern. For example, the structural integrity may be assessed by deploying a sonar tool into the cavern to measure the cavern size, such as measuring the neck.

In summary, this disclosure describes technology that can enable faster and more flexible hydrogen cavern development across a broader range of geologies and geographies without jeopardizing the safety or structural integrity of hydrogen cavern storage operations, thereby supporting the expected dynamic growth in hydrogen production and consumption in alignment with our nation's clean hydrogen strategy and roadmap.

Figure 2:
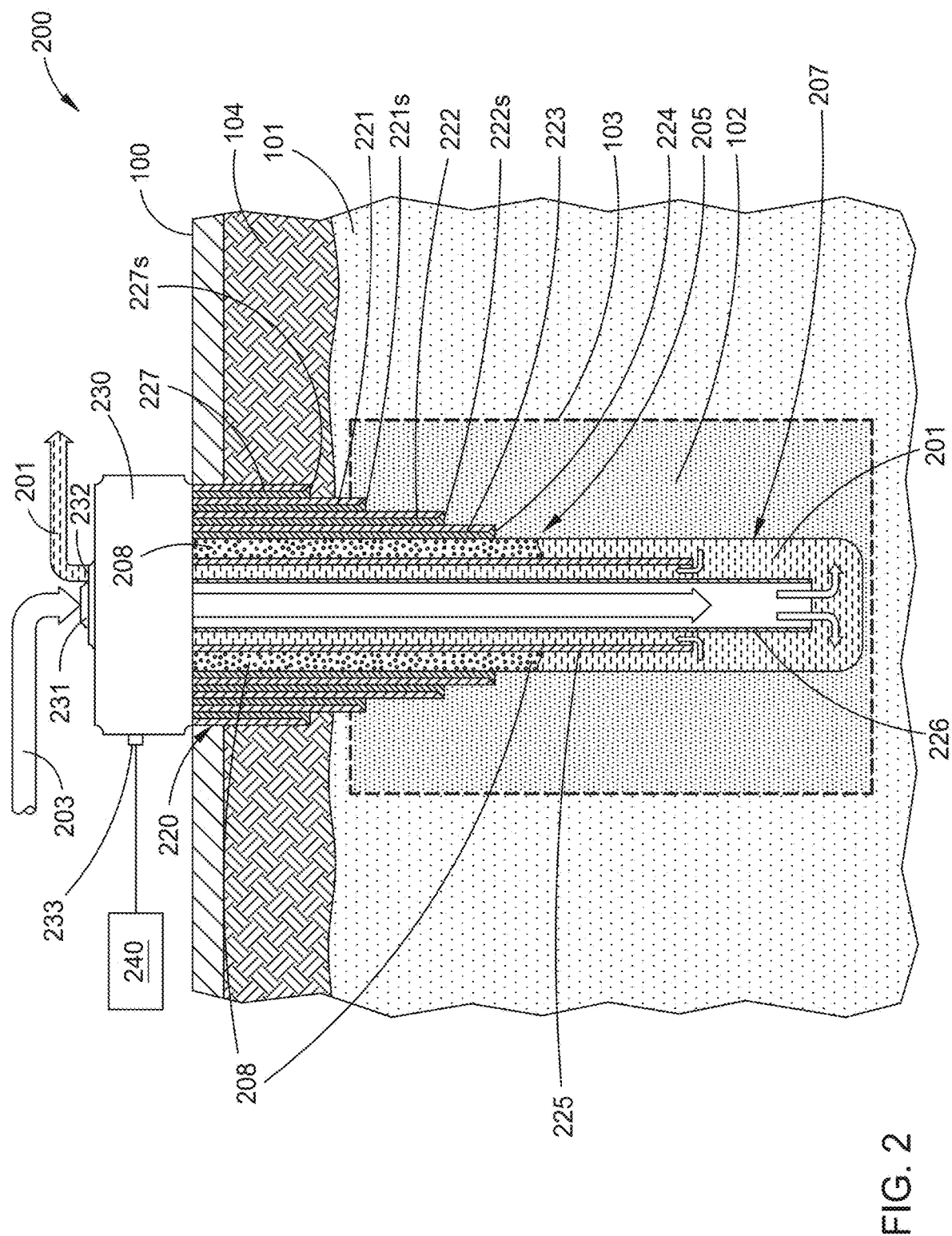
FIG. 2 illustrates a cavern system where a cavern is being solution mined into the salt formation of FIG. 1 to a first volumetric size, according to one or more embodiments of the present disclosure.

Salt caverns are formed through a process known as solution mining. With reference to FIG. 1, a salt formation 101, such as a salt dome, is illustrated that is located below the surface of the Earth 100. A cap rock 104 overlays the salt formation 101. With reference to FIG. 2, the process of solution mining involves drilling into the surface of the Earth 100 and then leaching (e.g., solution mining) the salt to form the cavern 207.

FIG. 2 illustrates a cavern system 200. As shown, a cavern 207 (such as a salt cavern) having a first size (e.g., first volume) is formed within the salt formation 101. A wellbore 210 is drilled into the salt formation 101 shown in FIG. 1 from the surface 100. A string assembly 220 is completed in the wellbore 210 and is connected to a wellhead 230. The string assembly 220 connects the wellhead 230 to the cavern 207. As shown, the string assembly 220 includes a first casing string 221, a second casing string 222, a third casing string 223, an outer conduit 225, an inner conduit 226, and one or more outer casing strings 227 that are set in one or more rock formations, such as the cap rock 104, above the salt formation 101. As illustrated, in some embodiments, the first casing string 221, second casing string 222, and third casing string are each partially disposed within the salt formation 101, and are disposed within the one or more outer casing strings 227. Each of the casing strings 221, 222, 223, and 227 are cemented in place. In some embodiments, one or more of the casing strings 221, 222, 223, or 227 are cemented to surface 100.

The first casing string 221 includes a first casing shoe 221s that is set within the salt formation 101. The top layer is the transition layer between the rock and the main body of the salt formation 101. The second casing string 222 is disposed within the first casing string 221 and extends deeper than the first casing string 221. The second casing string 222 has a second casing shoe 222s set within the salt formation 101 that is downhole of the first casing shoe 221s. The third casing string 223 (e.g., production casing) is disposed within the second casing string 222 and extends deeper than the second casing string 222. The third casing string 223 includes a third casing shoe 224. The third casing shoe 224 is the entrance to the cavern 207 that is being mined into the salt formation 101.

The third casing shoe 224 at the lower end of the third casing string 223 is set within the predetermined cylindrical region 102 to affix the third casing string 223 within and into the salt formation 101. The wellbore 210 is further drilled into the salt formation 101 down to the desired total depth of the cavern 207. The inner conduit 226 is inserted within an outer conduit 225, both of which hang from the wellhead 230 affixed on the surface 100 with the lowermost points of such conduits located below the third casing shoe 224 but above the bottom of the cavern 207. The third casing shoe 224 is set within the predetermined cylindrical region 102. In some embodiments, the first casing shoe 221s and/or the second casing shoe 222s may be set within the predetermined cylindrical region 102.

In some embodiments, the string assembly 220 is configured such that the first casing shoe 221s is set in the cap rock 104 above the salt formation 101, whereas the second casing shoe 222s and the third casing shoe 224 are set within the salt formation 101. In some examples, the first casing shoe 221s is set 200 feet or less above the top of the salt formation 101, such as 175 feet or less, 150 feet or less, 125 feet or less, 100 feet or less, 75 feet or less, or 50 feet or less above the top of the salt formation 101. In some examples, the second casing shoe 222s is set 500 feet or less below the top of the salt formation 101, such as 450 feet or less, 400 feet or less, 350 feet or less, 300 feet or less, or 250 feet or less below the top of the salt formation 101.

A solvent 203, such as raw water or other suitable solution mining fluid, is injected in order to dissolve the salt within the predetermined cylindrical region 102 to form a brine 201 to expand the cavern 207 to the first size shown in FIG. 2 after string assembly 220 is installed in the wellbore 210. In some embodiments, the solvent is injected into a first port 231 (e.g., inlet) of the wellhead 230. The solvent 203 flows from the first port 231 and into the cavern 207 via a first flow path within the string assembly 220. In some embodiments, the first flow path may be the bore of the inner conduit 226 as shown in FIG. 2. The solvent 203 is injected into the predetermined cylindrical region 102 to dissolve the salt and create a brine 201. The resultant brine 201 is returned to the surface 100 via a second flow path where it is either utilized or discarded. The resultant brine 201 may exit the wellhead 230 via a second port 232 (e.g., outlet). In some embodiments, the second flow path may be the annulus between the inner conduit 226 and the outer conduit 225. For example, the solvent 203 may be injected through the inner conduit 226 and the brine 201 is returned to the surface 100 through the outer conduit 225 as is shown in FIG. 2. In some embodiments, the solvent 203 may instead be injected into the second port 232 and through the annulus between the inner conduit 226 and the outer conduit 225, in which case the brine 201 is returned to the surface 100 through the inner conduit 226 and exits via the first port 231. Reversals of the direction of flow of the solvent 203 and brine 201 may be utilized to control the shape of the cavern 207 as it undergoes solution mining.

The present disclosure improves upon existing systems for hydrogen storage in salt caverns by leveraging the porosity of the salt within a predetermined cylindrical region 102 within the salt formation 101 to retain the hydrogen underground. Prior to drilling and commencement of solution mining operations, the hydrogen salt cavern storage developer can identify a candidate cavern location based on the porosity of the salt in salt formations. The salt is ideally impermeable or substantially impermeable (e.g., has low permeability values). Once a candidate location is identified, the cavern storage developer obtains one or core samples of the salt at the candidate location. The developer may obtain a core sample at different depths within a region of the salt formation in which the cavern may be formed. In other words, the developer may obtain core samples of the salt at different points along the planned height of the cavern. These core samples are then analyzed to determine various characteristics, such as the porosity of the salt, the creep of the salt, and/or the Young's Modulus of the salt. The salt cores also allow the developer to estimate the existing geostatic pressure and salt creep within the region the cavern is planned. Additionally the salt core analysis may be used to determine a porosity profile of the salt at various depths to estimate the amount of hydrogen than can seep into the salt. Similarly, the salt cores analysis may be used to estimate the creep of the salt that may occur at various portions of the cavern should the hydrogen within the cavern be extracted or reduced, such as due to the hydrogen blanket dropping below the minimum quantity of hydrogen.

If the salt core analysis confirms that the candidate location is a viable location to construct a cavern for hydrogen storage, then the predetermined cylindrical region 102 is identified within the salt formation 101. The predetermined cylindrical region 102 is defined by a distance extending radially outward in all directions from the salt core wellbore location and a distance (e.g., height) extending vertically from an upper point to a lower point below the surface 100 within the salt formation 101. The outer boundary 103 of the cylindrical region is shown in FIG. 2. The cavern 207 will be solution mined within the boundary 103.

The hydrogen salt cavern storage developer can identify the predetermined cylindrical region 102 based upon the available data regarding the size, shape, and suitability of the salt formation 101 for hydrogen salt cavern storage. Such data may include, without limitation, (i) the existing geostatic and lithostatic pressures that the geologic strata, groundwater, and salt formation 101 exert upon the predetermined cylindrical region 102, (ii) any studies, seismic data, regulatory reports, and/or well logs relating to nearby historical, existing or planned operations, and (iii) any salt core samples taken from elsewhere within the salt formation 101 and results of any laboratory tests conducted thereupon.

A key factor in determining the suitability of a particular salt formation 101 for hydrogen salt cavern storage is the permeability of the salt contained therein to hydrogen. Permeability can be determined, in some embodiments, using permeability tests on salt cores in a laboratory. As has been demonstrated in the laboratory setting, there are no practical, observable differences in the permeability of rock salt for natural gas and hydrogen. The permeability of rock salt is primarily a function of its purity, structure and the time and pressure under which it has been compacted. As a result, a salt formation 101 that would be suitable for natural gas salt cavern storage should also be suitable for hydrogen salt cavern storage.

Based upon the available data prior to drilling and commencement of solution mining operations, the hydrogen salt cavern storage developer can establish that the predetermined cylindrical region's boundary 103 can be sufficiently impermeable to hydrogen, provided that once the cavern 207 has been solution mined (i) the third casing shoe 224 and the cavern 207 extending therefrom downward vertically are both located within the predetermined cylindrical region's boundary 103, (ii) a minimum quantity of hydrogen that is introduced into the cavern 207 through the third casing string 223 is maintained within the predetermined cylindrical region 102 and (iii) a maximum pressure at the third casing shoe 224 is not exceeded. Given that no methodology for verifiably testing absolute impermeability under in-situ conditions exists, prior to drilling and commencement of solution mining operations the hydrogen salt cavern storage developer can establish that the predetermined cylindrical region's boundary 103 can be sufficiently impermeable by focusing on two key qualitative factors: whether (1) a cavern 207 solution mined in accordance with the preceding sentence can be capable of operating in a safe manner in accordance with all applicable regulatory requirements and prudent industry practices and (2) the amount of any stored hydrogen that might theoretically escape beyond the predetermined cylindrical region's boundary 103, or that cannot be verifiably proven to have not escaped using existing testing and measurement techniques, is within a commercially tolerable range.

The hydrogen salt cavern storage developer can examine the purity, structure, time, and pressure under which the predetermined cylindrical region 102 has been compacted in a manner consistent with common practice in the natural gas salt cavern storage industry, where permeability values of $k<1E-20$ m$^2$ are typical. To the extent no results of any laboratory tests conducted on salt core samples taken from elsewhere within the salt formation 101 are available, during the drilling of the wellbore the hydrogen salt cavern storage developer can extract one or more salt samples from the predetermined cylindrical region 102 for laboratory testing to confirm the developer's determination that the predetermined cylindrical region's boundary 103 can be sufficiently impermeable.

Once the wellbore 210 has been drilled and the tubing string 210 has been constructed, the depth of the third casing shoe 224 relative to the surface of the Earth 100 is measured and verified. In some embodiments, the depth of the third casing shoe 224 is measured and verified prior to installing the outer conduit 225 and inner conduit 226. In accordance with applicable regulatory requirements and prudent industry practices, hydrogen salt caverns are subject to permitted maximum allowable pressures. Such maximum allowable pressures are typically determined at the third casing shoe 224. In an example, the maximum allowable pressure may be set at 0.85 pounds per square inch per foot of depth relative to the surface 100.

The present disclosed technologies improve upon the existing technology in relation to hydrogen storage in salt caverns by introducing the concepts of a minimum quantity of hydrogen maintained within the predetermined cylindrical region 102 and the maintenance of a hydrogen blanket 208 during solution mining operations. The hydrogen salt cavern storage developer can determine the minimum quantity of hydrogen that must be maintained within the predetermined cylindrical region's boundary 103 once the third casing shoe 224 has been verifiably located within the predetermined cylindrical region's boundary 103 and the maximum allowable pressure at the third casing shoe 224 has been determined. The minimum quantity increases as the cavern 207 is expanded within the predetermined cylindrical region 102. However, seepage of some hydrogen gas into the surrounding salt is accounted for in the minimum quantity of hydrogen based on the known properties of the salt.

During solution mining operations, the minimum quantity of hydrogen is referred to as the hydrogen blanket 208 as shown on FIG. 2. The hydrogen blanket 208 is introduced into the third casing string 223 and extends down into the cavern 207 below the third casing shoe 224 but above the brine 201. The hydrogen blanket 208 protects the area of exposed rock salt within the cavern 207 being formed in predetermined cylindrical region 102 near the third casing shoe 224 by preventing contact with brine 201 or solvent 203 (e.g., raw water). Additionally, the hydrogen blanket 208 also maintains the integrity of the cavern 207 to avoid collapse or substantial creep of the salt. This protective function of the hydrogen blanket 208 is important because the third casing shoe 224 and the third casing string 223 penetrate the predetermined cylindrical region 102 and if the rock salt near the third casing shoe 224 and the third casing string 223 is solution-mined the stability of the third casing shoe 224 and third casing string 223 might become compromised. For example, solution mining the salt around the third casing shoe 224 may allow for a leak path to develop such that the cavern 207 is no longer viable to retain hydrogen. Whereas prior systems have utilized a layer of diesel fuel, nitrogen, or other substance as a protective blanket, the present disclosed technology may utilize hydrogen as the hydrogen blanket 208. The use of hydrogen as the blanket eliminates the introduction of an impurity that must later be removed, and reduces the need for additional equipment to handle the diesel fuel, nitrogen, or other substance. Additionally, the use of hydrogen as the blanket enables further solution mining to expand the cavern after the cavern has been placed into hydrogen storage service.

The present disclosure overcomes the alleged and assumed deficiencies and challenges associated with utilizing hydrogen gas as a blanket during the solution mining of salt for hydrogen storage. Historically, the use of hydrogen gas for this purpose has been hampered by several limiting factors. For instance, the logistics of hydrogen supply were considered prohibitive, given the ready availability and ease of transport of nitrogen gas in liquid cryogenic form. Furthermore, the heightened product purity standards of today were not a focal point in past solution mining operations, leading to the pervasive use of dirty blanket materials such as diesel. Additional challenges included the molecular size of hydrogen, which presents a heightened risk of leakage through wellheads, casing, and other cavern components, as well as hydrogen's flammability and compressibility, which complicates control of the blanket/brine interface in the cavern.

To address the logistical concerns, the present disclosed technology takes advantage of the increasingly common production and availability of hydrogen, facilitated by the ongoing transition of U.S. energy infrastructure and policy. In particular, the disclosed technology is optimally situated to leverage existing hydrogen pipelines and the growing prevalence of liquid hydrogen shipments, thus rendering hydrogen as accessible as nitrogen for blanket gas applications. Additionally, the presently disclosed technology drastically reduces the time required to create hydrogen storage capacity in multiple salt types which promotes the growth and development of hydrogen production.

As for the issue of cleanliness and purity, the presently disclosed technology utilizes hydrogen as both the blanket and stored product, thereby eliminating the introduction of foreign contaminants like diesel, which have traditionally necessitated costly cleaning procedures exceeding $1 million prior to the cavern being placed "in-service." By employing hydrogen in this dual capacity, the disclosed technology significantly reduces both the effort and the expense associated with maintaining the requisite product specifications.

In relation to the small molecular size of hydrogen, which has historically led to leakage concerns, the present disclosed technology can incorporate advanced materials and engineering designs for the casing pipes, wellheads, and tubulars to effectively contain hydrogen. Additionally, to mitigate risks associated with hydrogen's flammability, the disclosed technology can utilize state-of-the-art safety measures directly into the design of the solution mining facilities and cavern wells. These measures are aimed at detecting, shutting down, containing, and possibly evacuating the hydrogen in the event of any flammability conditions. Finally, to address issues related to hydrogen's compressibility, the disclosed technology can employ enhanced monitoring technologies such as frequent sonar tracking and well logging during the solution mining process, providing greater control over the hydrogen/brine interface than is typically achievable when using nitrogen or other blanket gases.

In summary, the present disclosed technology overcomes the historical barriers to using hydrogen as a blanket gas during solution mining of salt formations for hydrogen storage, and in doing so, it offers a significantly improved, cost-effective, and safer alternative to existing methods. As solution mining is commenced but prior to commencement of hydrogen storage operations, the minimum quantity of hydrogen being utilized as the hydrogen blanket 208 as shown in FIG. 2 is determined with reference to the total volume within the predetermined cylindrical region 102 that can be occupied by hydrogen gas. Below is an example equation to determine the total volume ($V_{Total}$) with the predetermined cylindrical region 102 and string assembly 220 that can be occupied by the hydrogen gas. The total volume, however, changes over time as the cavern 207 increases in size and the volume of brine fluctuates within the predetermined cylindrical region 102.

$$V_{Total} = V_{permeable} + V_{cavern} + V_{annulus} - V_{Brine}$$

This total volume includes the permeable volume ($V_{permeable}$) within the salt (e.g., pore space) that the hydrogen can seep into the salt within the predetermined cylindrical region 102. This value may be a function of hydraulic conductivity (based on Darcy's law or a similarly derived formula) over a period of time, known as the fluid permeation zone. The zone (e.g., salt) is corrected for the porosity of the salt mass occupied by the fluid. The permeable volume, however, does not include the volume of the salt itself but instead the calculated volume of the pore space. Determining the pore space of the salt within the predetermined cylindrical region that hydrogen could occupy is complex, and in practice, $V_{permeable}$ will be determined by numerical modeling of the measured cavern shape within the predetermined cylindrical region 102 as a function of the most recent sonar of the in situ cavern. The resultant hydrogen is calculated from a determination of porosity volume of the salt mass that the hydrogen will occupy. Similarly to permeability, porosity value(s) are determined by geomechanical testing of stratigraphic salt cores. Below is an example equation for determining $V_{permeable}$.

$$V_{Permeable} = (2\pi((l+r)^2 - r^2) * H + 2\pi(r+l)^2 * \text{porosity factor}$$
$$l = Q_x * t$$

Variable "t" is time, variable "r" is radius of the salt cavern over the height "h" of the cavern. Variable "l" is the average length of hydraulic conductivity of hydrogen flow into the salt, normal to the cross-sectional area over the surface area of the cavern for a prescribed period of time, t (sec). Variable "$Q_x$" is the flow rate of hydrogen through salt normal to a unit cross-sectional area as derived from hydraulic conductivity (e.g., permeability) experiments and geomechanical analysis by a qualified laboratory of stratigraphic salt cores. Such samples are taken from the wellbore during the drilling process.

The total volume also includes the volume of the cavern ($V_{cavern}$), which is the volume of the cavern 207 as measured by sonar and other technologies from the top of the cavern (e.g., entrance to the third shoe 224) to the bottom of the cavern 207. The volume of the cavern also includes the volume of the neck 205 of the cavern 207. The neck 205 of the cavern 207 is a narrow region extending from the third shoe 224 that leads to the main part of the cavern 207 that develops during solution mining. The third shoe 224 defines the opening in the neck 205 that leads to the string assembly 220. The cavern volume does not include the volume occupied by the portion of the string assembly 220 disposed in the cavern 207.

The total volume also includes the volume of the third flow path (e.g., volume of the annulus between third casing string 223 and outer conduit 225) extending from the wellhead 230 to the third casing shoe 224. This volume is denoted as $V_{annulus}$. In some embodiments, the total volume excludes the volume of the third flow path outside of the predetermined cylindrical region 102. In some embodiments, the total volume includes the volume of the third flow path from the opening of the third casing shoe 224 to the third port 233 (e.g., inlet) in the wellhead 230. In some embodiments, such as when the cavern 207 is debrined, the inner conduit 226 is removed and the outer conduit 225 may be at least partially filled with hydrogen gas. Thus, $V_{annulus}$ may include the volume of the outer conduit 225 that is fillable with hydrogen gas when those situations apply.

The total volume, in some embodiments, excludes the volume of the brine (e.g., $V_{Brine}$). The volume of the brine within the cavern 207 may be estimated based on the amount of solvent 203 injected, the amount of brine 201 extracted, the salinity of the brine, and the temperate of the brine. The salinity of the brine may be estimated based on the leaching rate, measured within the cavern 207, and/or measured when the brine 201 exits the second port 232. The salinity of the brine 201 is used to determine how much of salt is contributing to the volume of the fluid within the cavern 207. In some embodiments, the volume of the brine 201 is estimated by a mass analysis, where the mass of brine 201 within the cavern 207 is determined based on at least the mass of the solvent 203 injected, the mass of the brine 201 extracted, and the salinity of the brine 201 to estimate the amount of salt dissolved within the brine 201 within the cavern 207. In some embodiments, the volume of the brine may also be based on a calculated, measured, or estimated quantity of hydrogen dissolved within the brine 201. The volume of the brine 201 may be negligible when the cavern 207 is substantially emptied of brine 201 at the completion of the cavern 207.

In some embodiments, total volume (e.g., $V_{Total}$) is an estimated value. In other words, the total volume may not be an exact measured value but may instead be a value estimated by various data inputs. For example, the volume of the brine ($V_{Brine}$), the volume of the cavern ($V_{cavern}$), the volume of the third flow path ($V_{Annulus}$), and/or the permeable volume within the salt ($V_{permeable}$) may be an estimated value.

During solution mining the quantity of hydrogen injected to form the hydrogen blanket 208 is monitored through instrumentation located at the wellhead 230. At the beginning of solution mining operations, the minimum quantity of hydrogen that must be maintained within the predetermined cylindrical region's boundary 103 is a relatively small quantity based upon the volume of space the hydrogen blanket 208 must occupy above the brine 201 in order to adequately protect the area around the third shoe 224 from undesirable solution mining as previously described, plus the additional volume available for hydrogen gas to permeate into salt within the predetermined cylindrical region 102. The relative amount of such additional volume is dependent upon the permeability characteristics of the rock salt contained within the predetermined cylindrical region 102 as ascertained through laboratory tests conducted on salt core samples taken during the drilling of the wellbore or from elsewhere within the salt formation 101, as the case may be.

As solution mining operations continue, the volume of the cavern 207 increases as solvent 203 is injected into the rock salt existing within the predetermined cylindrical region 102, which is dissolved and becomes brine 201. The brine 201 is later retrieved to the surface of the Earth 100 and utilized elsewhere or discarded. As such solution mining operations continue, the hydrogen blanket 208 continues to perform its protective functions, and the minimum quantity of hydrogen that must be maintained within the predetermined cylindrical region's boundary 103 increases commensurately, but is partially offset as the additional minimum volume that could theoretically permeate from the cavern 207 into the predetermined cylindrical region 102 decreases as the rock salt is mined. Throughout solution mining operations, a maximum pressure of the hydrogen blanket 208 at the third casing shoe 224 is maintained at or below the prescribed maximum allowable pressure.

The present disclosed technologies further improve upon the existing technology in relation to hydrogen storage in salt caverns by enabling the cavern 207 to be placed into hydrogen storage service before the cavern 207 has reached its targeted volumetric capacity. The cavern 207 can be solution mined to achieve the minimum viable volumetric capacity, which is a sufficient storage capacity for the applicable regulatory agency having jurisdiction to conduct necessary testing to establish the integrity of the cavern 207. The federal investment tax credit for hydrogen storage facilities becomes available once the relevant authority having jurisdiction determines that the cavern 207 passes integrity testing and otherwise determines that the cavern 207 can be safely operated. Integrity testing typically involves a sonar to determine the size and shape of the cavern 207 and a mechanical integrity test to establish that the cavern 207 can be operated safely. The mechanical integrity test includes applying pressure at the lowermost cemented casing up to the regulatory maximum allowable operating pressure, and monitoring for leaks over a minimum time duration. Once the applicable regulatory agency having jurisdiction has granted the cavern 207 permission to operate, the hydrogen salt cavern storage operator can inject hydrogen into the open volume in the cavern above the brine interface below the third shoe 224.

Figure 3:
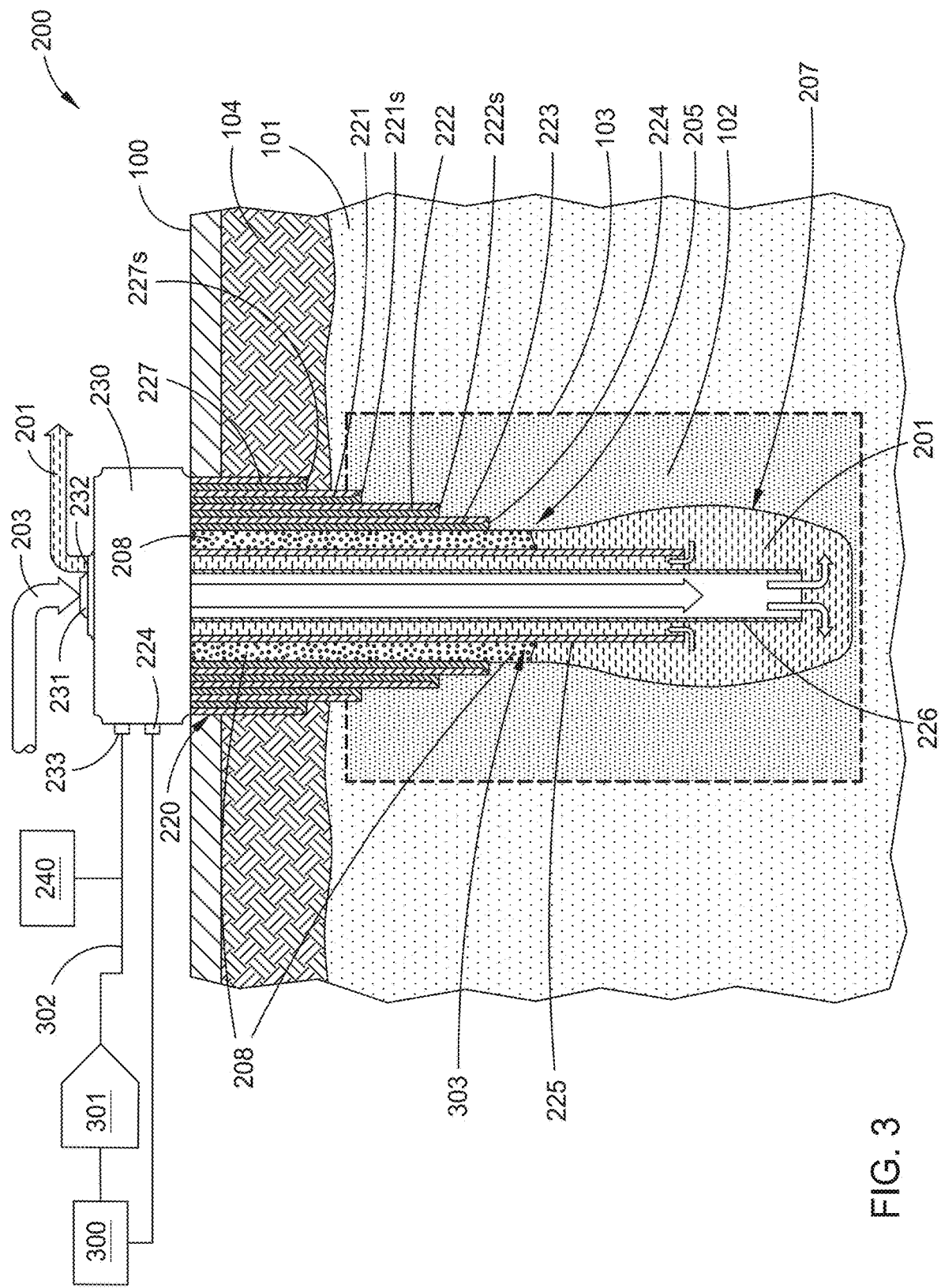
FIG. 3 illustrates the cavern system where the cavern has been expanded within the salt formation of FIG. 1 to a second volumetric size from the first volumetric size shown in FIG. 2, and a hydrogen pipeline and compressor has been connected to a wellhead, according to one or more embodiments of the present disclosure.

FIG. 3 illustrates the cavern 207 of the cavern system 200 having the minimum viable cavern size after being solution mined from the cavern size shown in FIG. 2. In some embodiments, and as shown in FIG. 3, a hydrogen pipeline 300 and hydrogen compressor 301 may be coupled to the wellhead 230 before or after reaching the minimum viable cavern size. Hydrogen gas may be introduced into the hydrogen compressor 301 to produce compressed hydrogen 302. The compressed hydrogen 302 is then injected into the cavern 207 to produce stored hydrogen 303. For example, the compressed hydrogen 302 may be injected into the third port 233 and flow into the open volume of the cavern 207 via the third flow path (e.g. annulus between the outer conduit 225 and inner conduit 226). In some embodiments, the quantity of hydrogen injected into the third port 233 may be measured in standard cubic feet.

The stored hydrogen 303 can be maintained in the upper region of the cavern 207 and can be commingled with the hydrogen blanket 208. In some embodiments, the stored hydrogen 303 augments the hydrogen blanket 208. The hydrogen blanket 208 continues to perform its protective functions as previously described even as stored hydrogen 303 is injected and withdrawn from the cavern 207 into the hydrogen pipeline 300 in accordance with customers' demands. The hydrogen blanket 208 also provides protection during solution mining activities occurring in the lower region of the cavern 207 through additional injection of solvent 203 which becomes brine 201 that is later removed. Similar to before commencement of hydrogen storage operations, the minimum quantity of hydrogen that must be maintained within the predetermined cylindrical region's boundary 103 continues to increase commensurately with the expansion of the volumetric capacity of the cavern 207, but is partially offset as the additional minimum volume that could theoretically permeate from the cavern 207 into the predetermined cylindrical region 102 decreases as the rock salt is mined. The required minimum quantity of hydrogen is maintained at all times and is monitored (through, for example, instrumentation located at the wellhead). A maximum pressure of the hydrogen blanket 208 at the third casing shoe 224 is maintained at or below the prescribed maximum allowable pressure.

In some embodiments, some of the stored hydrogen 303 may be withdrawn (e.g., extracted) through the third port 233. In some embodiments, the stored hydrogen 303 is withdrawn through a fourth port 234 in the wellhead 230 that is in communication with the cavern 207, such as being in communication with the annulus between the third casing 223 and the outer conduit 225.

A pad gas supply 240, as shown in FIG. 3, may be connected to the third port 233. The pad gas supply 240 comes from hydrogen pipeline 300 or one or more containers of hydrogen gas that can be used to compensate for the hydrogen gas withdrawn by a customer. In other words, the pad gas supply 240 is used to ensure that the minimum quantity of hydrogen is maintained within the cavern 207 while the customer's demand is fulfilled. For example, hydrogen gas from the pad gas supply 240 may be injected into the cavern 207 through the third port 223 while hydrogen is withdrawn from the cavern 207 through the fourth port 234. In some embodiments, the pad gas may be injected through the same port that the hydrogen gas was or will be extracted from. For example, hydrogen gas from the pad may be injected prior to withdrawing a customer's gas based on the amount of gas that will need to be extracted to meet the demand to maintain the minimum quantity of hydrogen within the cavern 207. In some embodiments, the pad gas 240 is not injected into the wellhead 230 via the third port 233 that is connected to the outlet of the compressor 301. Rather, the pad gas 240 may be injected through a fifth port in the wellhead that is in communication with the cavern 207, such as a port in communication with the annulus between the third casing 233 and the outer conduit 225.

The present disclosed technologies further improve upon the existing technology in relation to hydrogen storage in salt caverns by allowing the hydrogen salt cavern storage operator to dynamically adjust the targeted volumetric capacity of the void space within the cavern 207 so long as the cavern remains contained with the predetermined cylindrical region's boundary 103. In other words, the volume of the cavern 207 may be increased after being placed into commercial hydrogen storage service (e.g., after reaching the minimum viable cavern size). Once the cavern 207 has been solution mined to its targeted volumetric capacity, solvent 203 is no longer injected into the cavern 207. Over time, substantially all brine 201 is removed from the cavern 207 through the use of a submersible pump placed within the lower region of the cavern 207 and/or by increasing the volume of stored hydrogen 303 within the cavern 207, provided that a maximum pressure of the stored hydrogen 303 at the third casing shoe 224 does not exceed the prescribed maximum allowable pressure. During hydrogen storage operations, the required minimum quantity of hydrogen is maintained at all times and is monitored through instrumentation located at the wellhead. The submersible pump may be part of an electric submersible pump system that is installed within the inner conduit 226. In some embodiments, the pump may be installed at the lower end of the inner conduit 226.

Figure 4:
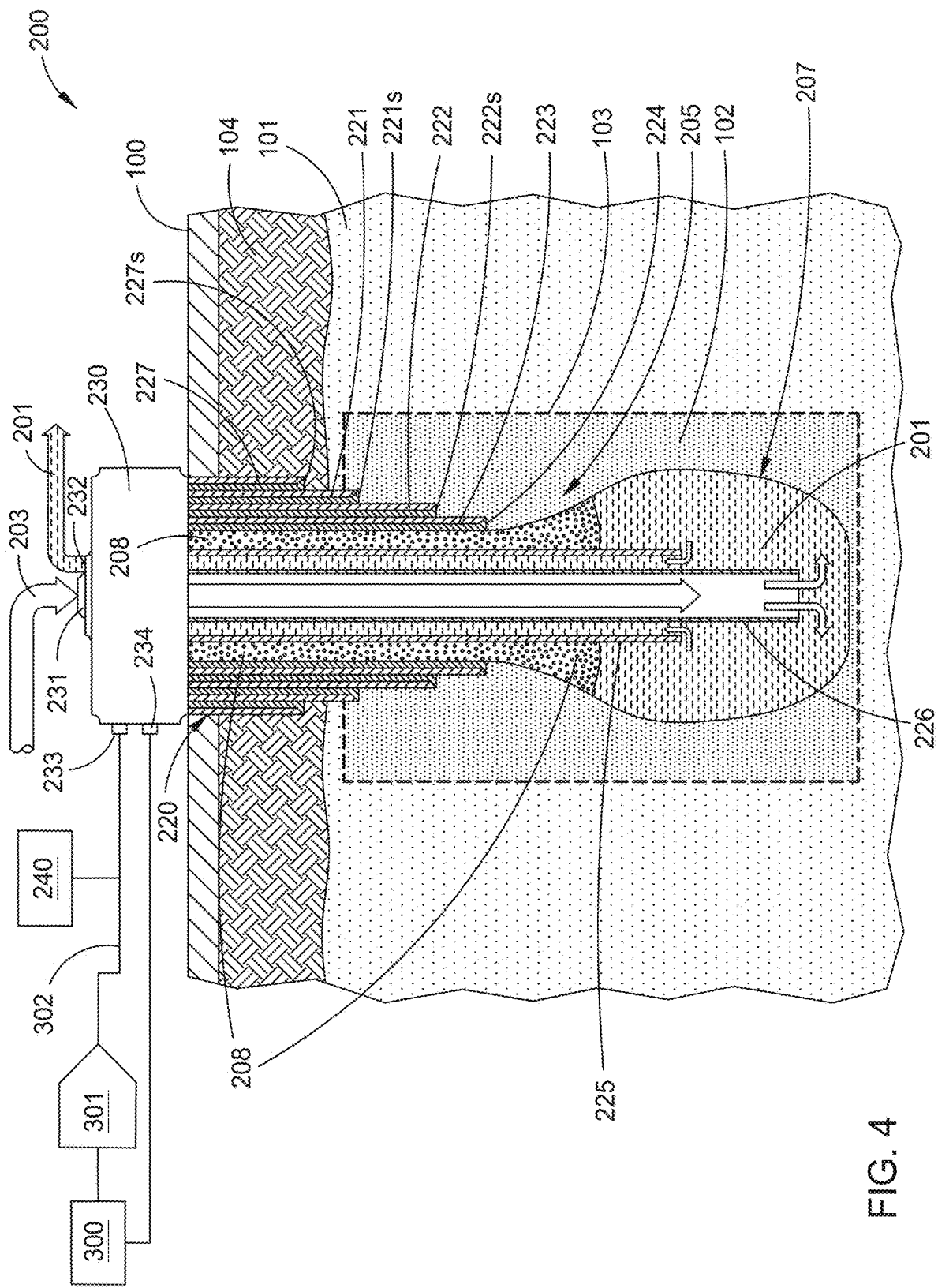
FIG. 4 illustrates the cavern system where the cavern has been expanded from the second volumetric size shown in FIG. 3 to a third volumetric size, according to one or more embodiments of the present disclosure.
Figure 5:
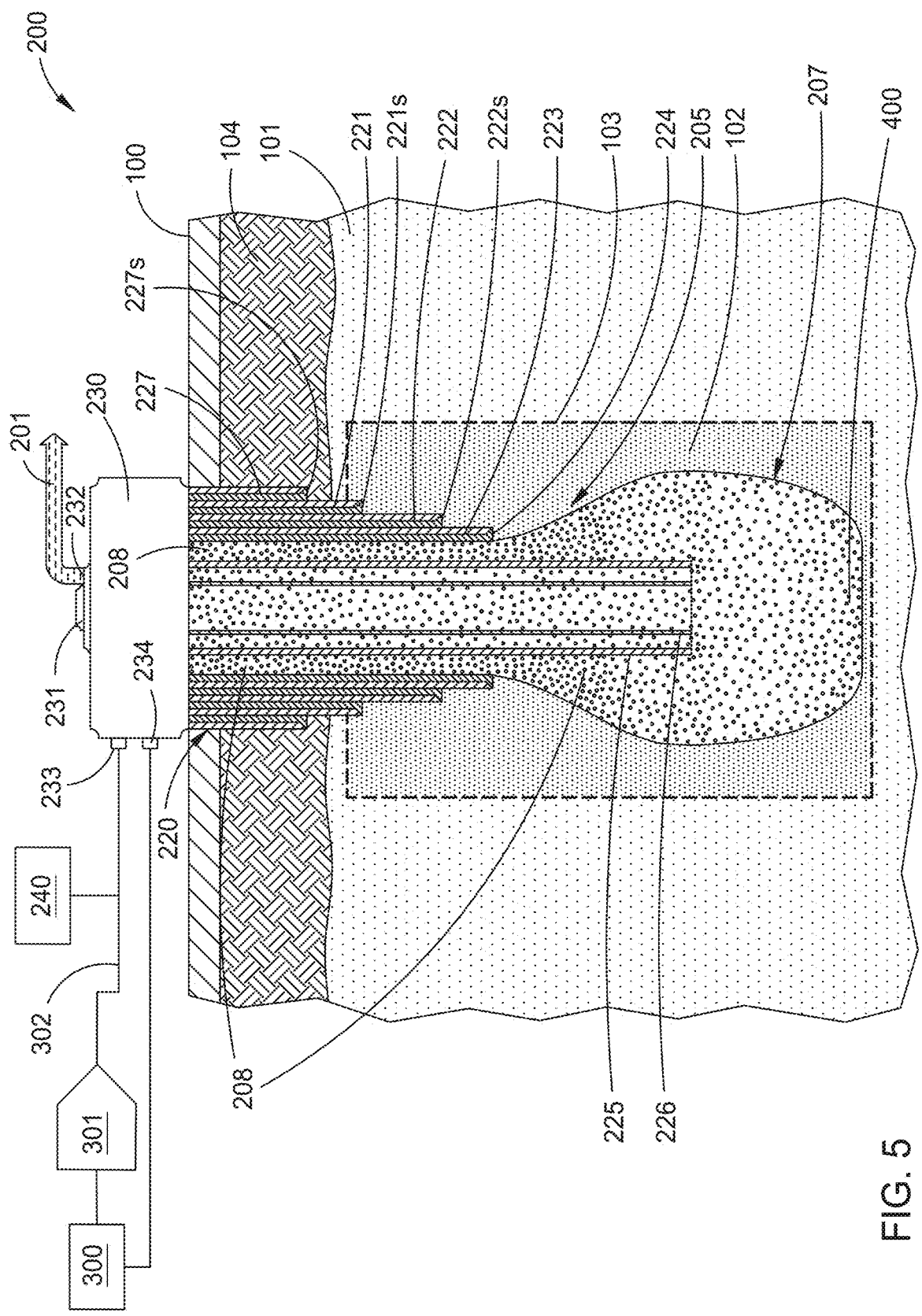
FIG. 5 illustrates the cavern system where the cavern has been expanded from the third volumetric size shown in FIG. 4 to a fourth volumetric size, according to one or more embodiments of the present disclosure.

FIG. 4 illustrates the cavern 207 of cavern system 200 after being expanded from the minimum viable cavern size to a larger volumetric size. As discussed above, the cavern 207 may continue to be expanded and then debrined. FIG. 5 shows the final operational state (e.g., has been debrined) of the cavern 207 of the cavern system 200 which can be maintained for the operational life of the hydrogen cavern storage facility, subject only to periodic mechanical integrity tests as may be required by the applicable regulatory agency having jurisdiction. In some embodiments, a small, residual layer of brine may be present at the bottom of the cavern 207 in its final operational state that could not be removed by the submersible pump.

In some embodiments, the minimum quantity of hydrogen is a minimum volume. In other words, determining the minimum quantity of hydrogen needed for the blanket 208 or to have otherwise in the cavern 207 (e.g., after expanding the minimum viable cavern size by solution mining while storing hydrogen) requires evaluating the amount of standard cubic feet of hydrogen gas that needs to be injected into the wellhead 230. This can include multiplying the current $V_{Total}$ by a factor to determine the amount of standard cubic feet of hydrogen that needs to be injected into the wellhead 230. For example, the minimum volume of hydrogen gas may be between 3 times $V_{Total}$ and 50 times $V_{Total}$. For example, the minimum volume of hydrogen gas may be about 10 times $V_{Total}$, such as about 15 times $V_{Total}$, such as about 20 times $V_{Total}$, such as about 25 times $V_{Total}$, such as about 30 times $V_{Total}$, such as about 35 times $V_{Total}$, such as about 40 times $V_{Total}$, such as about 45 times $V_{Total}$. In some embodiments, the minimum volume of hydrogen may be less than 3 times $V_{Total}$ or greater than 50 times $V_{Total}$. The minimum volume of hydrogen may be based on the characteristics of the salt formation 101, such as the permeability and/or creep of the salt. In other words, the factor may be based on the characteristics of the salt formation 101. Also, the factor may be based on the size of the cavern 207 in addition to characteristics of the salt. Thus, the factor may change as the cavern 207 increases in size. The volume of the hydrogen being injected into the wellhead 230 is measured and compared to the minimum volume required. Additional hydrogen is injected into the wellhead, such as from the pad gas supply 240, when necessary to increase the amount of hydrogen gas. For example, additional standard cubic feet of hydrogen may be injected, such as being injected after being compressed by the compressor 301, as the $V_{Total}$ increases.

In some embodiments, the maximum volume that can be within the cavern can be between 130 to 150 times the $V_{Total}$. Thus, the amount of hydrogen within the cavern 207 can exceed the minimum amount, such as the minimum volume, but should not exceed the maximum volume allowable based on the depth of the bottommost casing shoe and the properties of the salt formation 101 within which the cavern 207 is located.

In some embodiments, the minimum quantity of hydrogen is a minimum mass of hydrogen. In other words, determining the minimum quantity of hydrogen needed for the blanket 208 or to have otherwise in the cavern 207 requires evaluating the mass of hydrogen gas that needs to be injected into the wellhead 230. This can include multiplying the current $V_{Total}$ by a factor to determine the minimum mass of hydrogen that needs to be within the cavern 207. For example, the minimum mass of hydrogen gas may be greater than 5 times $V_{Total}$. For example, the minimum mass of hydrogen gas may be about 10 times $V_{Total}$, such as about 15 times $V_{Total}$, such as about 20 times $V_{Total}$, such as about 25 times $V_{Total}$. In some embodiments, the minimum mass of hydrogen gas may be about 50 times $V_{Total}$ or even up to or exceeding 100 times $V_{Total}$. In some embodiments, the minimum mass of hydrogen may be less than 5 times $V_{Total}$. The minimum mass of hydrogen may be based on the characteristics of the salt formation 101. Additional standard cubic feet of hydrogen may be injected, such as being injected after being compressed by the compressor 301, as the $V_{Total}$ increases. The mass of the hydrogen being injected into the wellhead 230 is measured and compared to the minimum mass required. Additional hydrogen is injected into the wellhead, such as from the pad gas supply 240, when necessary to increase the amount of hydrogen gas. For example, additional standard cubic feet of hydrogen may be injected having a desired mass, such as being injected after being compressed by the compressor 301, as the $V_{Total}$ increases.

Salt can begin to creep if the amount of hydrogen gas is below the minimum quantity. Also, the salt can be compressed if the hydrogen gas reaches a pressure that can deform the salt. It is believed that domal salt can rebound (e.g., self heal) close to an original shape. In other words, deformation of the domal salt caused by too much or too little hydrogen within the cavern can be mended over time due to the elastic properties of the salt. The properties of the salt can be used to model the estimated deformation, such as by determining an estimated rate of creep of the salt, if the quantity of hydrogen within the cavern 207 drops below the minimum quantity. The cavern operator can respond to hydrogen market conditions by rapidly producing hydrogen from the cavern 207 based on the estimated deformation of the salt. This production of hydrogen may occur after the cavern 207 is placed into hydrogen storage service.

Thus, a cavern operator can determine how much the cavern 207 may deform over a period of time if the hydrogen gas within the cavern is reduced below the minimum quantity. The cavern operator can use this estimated deformation over time to determine if the amount of hydrogen within the cavern 207 can be reduced temporarily below the minimum quantity. For example the operator may compare the modeled deformation to a deformation threshold. The deformation threshold may be an amount of deformation that structurally compromises the integrity of the cavern even if the salt may experience some rebounding. For example, the deformation threshold may be based on an unacceptable amount of deformation that occurs in the neck 205 of the cavern 207 that can destabilize the shoe 224 and/or obstruct the neck 205. If the modeled deformation is less than the deformation threshold, then the operator can proceed with emptying the cavern 207 until a predetermined amount of hydrogen remains in the cavern 207. The operator can, for example, determine how many days need to pass before the cavern 207 is structurally compromised to determine how quickly to reestablish the minimum amount of hydrogen in the cavern 207. Thus, the operator may determine that the deformation threshold will not be exceeded until a period of time, such as a few days, passes.

A sonar tool may be deployed into the cavern 207 to monitor the deformation of the salt as the cavern 207 is being emptied. The sonar tool may be used to monitor the deformation of the cavern 207, such as the deformation of the neck 205, as the cavern 207 is being emptied. The data obtained from the sonar tool can be used to adjust the time frame for hydrogen production and/or adjust the amount of hydrogen that can be extracted. For example, the sonar tool may detect that the salt is creeping faster or slower than expected based on the modeled deformation. The operator can adjust the hydrogen production operation based on the data obtained from the sonar tool. Additionally, the empting process may be stopped if the sonar detects an undesirable deformation in the salt, such as a partial collapse of the neck 205. A remedial solution mining operation, such as a washing of the neck 205, may be conducted to re-open the neck 205 should the neck 205 deform, such as partially or fully collapsing.

In some embodiments, the sonar tool may be deployed after producing hydrogen from the cavern 207 to assess the change in the salt. A remedial solution mining operation, such as a washing of the neck 205, may be conducted to re-open the neck 205 if the sonar detects that the neck 205 has deformed, such as partially or fully collapsing.

In some embodiments, the sonar tool is deployed to monitor hydrogen production from the cavern 207 without first evaluating a target remaining quantity of hydrogen within the cavern 207 below the minimum hydrogen quantity based on a deformation threshold. The data obtained by the sonar tool is used to evaluate and adjust the hydrogen production operation, such as stopping hydrogen production and/or adjusting the flow rate (e.g., adjusting a valve connected to the outlet) when the data obtained by the sonar tool reflects the presence of an undesirable creep of the salt.

In some embodiments, the quantity of hydrogen within the cavern 207 can temporarily be reduced below the minimum quantity of hydrogen depending on the salt properties. For example, the cavern 207 can be substantially emptied of hydrogen (e.g., emptied until the pressure differential between the cavern and the wellhead no longer results in hydrogen gas flow). For example, the cavern 207 can, over the course of one or more days, be depressurized to 0 psig or close to 0 psig (e.g., such as being less than 10 psig). However, the flow rate of hydrogen out of the cavern 207 decreases over time as the pressure differential diminishes. Thus, the cavern 207 may be, over the course of one or more days, be emptied until the flow rate diminishes to an undesirable level. For example, the cavern 207 may be emptied until a gauge pressure measured reaches about 100 psig. The amount of hydrogen within the cavern 207 is later returned to be at or exceed the minimum quantity of hydrogen within a timescale that avoids structurally compromising the salt. In other words, the cavern 207 can be rapidly emptied to below the minimum amount of hydrogen without structurally compromising the cavern. The cavern, over time, can at least partially rebound once the amount of hydrogen within the cavern 207 is returned to at least the minimum quantity.

Additionally, it is believed that the cavern 207 can undergo a plurality of cycles of rapid hydrogen production without sustaining long term structural damage and can be repeatedly refilled with hydrogen without substantial loss in storage volume. Each cycle may be delayed by a time period sufficient to allow the salt formation 101 to rebound.

In some embodiments, two or more casing shoes may be set in the salt formation 101. For example, a first casing shoe of a first casing may be set near the top of the salt and a second casing shoe of a second casing (e.g., production casing) is set where the cavern will be solution mined (e.g., will be the opening to the cavern). A third casing shoe of a third casing is set in the salt formation between the first casing shoe and the second casing shoe. The third casing is disposed within the first casing around the second casing.

Figure 6:
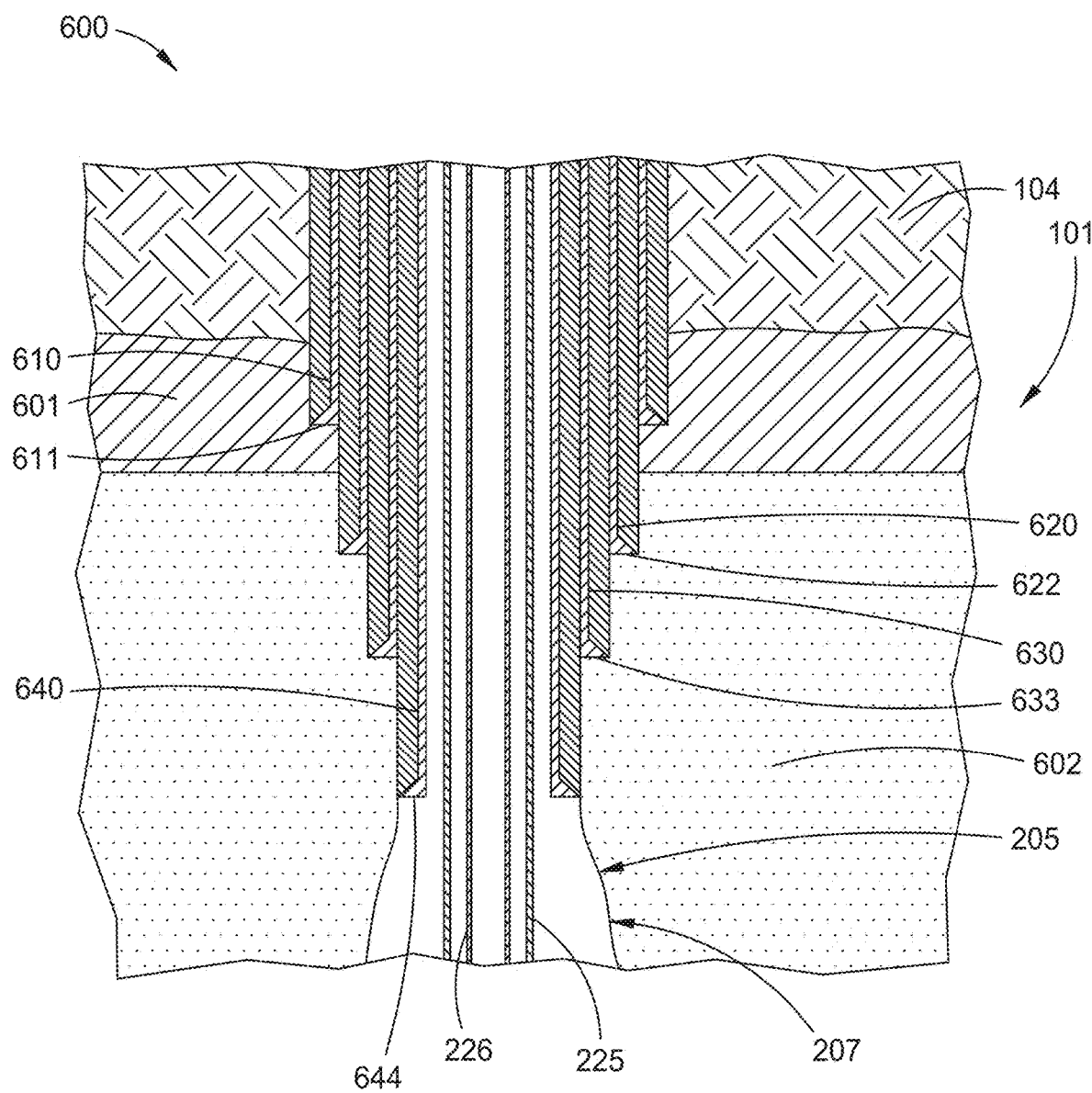
FIG. 6 illustrates a string assembly that can be used during the solution mining of a salt cavern within a salt formation, according to one or more embodiments of the present disclosure.

In some embodiments, four casing shoes may be set into the salt formation 101. FIG. 6 illustrates a string assembly 600 that can be used during the solution mining of a cavern, such as cavern 207 in the form of a salt cavern. The string assembly 600 includes a first casing string 610, a second casing string 620, a third casing string 630, and a fourth casing string 640 that are each at least partially disposed within the salt formation 101. Each of the casing strings 610, 620, 630, and 640 are cemented in place. In some embodiments, one or more of the casing strings 610, 620, 630, or 640 are cemented to surface 100. The string assembly 600 may include other casing strings that are set within the rock formations above the salt formation 101. The string assembly 600 also includes the inner conduit 226 and outer conduit 225, which are shown disposed within the fourth casing string 640 and extending past the neck 205 into the main portion of the cavern 207.

The first casing string 610 includes a first shoe 611 that is set within the top layer 601 of the salt formation 101. In some embodiments, the top layer 601 is a transition layer between the cap rock 104 and the main body 602 of the salt formation 101. In some embodiments, the top layer 601 may have less desirable porosity (e.g., higher porosity) than the main body 602.

The second casing string 620 is disposed within the first casing string 610 and extends deeper than the first casing string 610. The second casing string 620 has a second shoe 622 set within the main body 602 of the salt formation 101 that is downhole of the first casing shoe 611.

The third casing string 630 is disposed within the second casing string 620. The third casing string 630 extends deeper than the second casing string 620 and includes a third shoe 633 set within the main body of the salt formation 101 that is downhole of both the first casing shoe 611 and the second casing shoe 622.

The fourth casing string 640 is disposed within the third casing string 630. The fourth casing string 640 extends deeper than the third casing string 630 and includes a fourth shoe 644 set within the main body of the salt formation 101 that is downhole of the first casing shoe 611, the second casing shoe 622, and the third casing shoe 633. The fourth casing string 640 is a production casing configured to receive the inner conduit 226 and outer conduit 226. Solvent and/or blanket material (e.g., hydrogen) can flow through the annulus between the fourth casing string 640 and the outer conduit 225.

The fourth shoe 644 is set within the predetermined cylindrical region 102. In some embodiments, the second casing shoe 622 and/or third casing shoe 633 may also be set within the predetermined cylindrical region 102.

Without being bound by theory, it is believed that having four casing strings partially embedded in the salt formation 101 improves the containment of the hydrogen within the cavern 207. In other words, adding a fourth casing string into the salt formation helps reduce leakage. In some embodiments, more than four, such as five, six, seven, or eight casing strings may be embedded in the salt formation to help contain the hydrogen within the cavern.

Figure 7A:
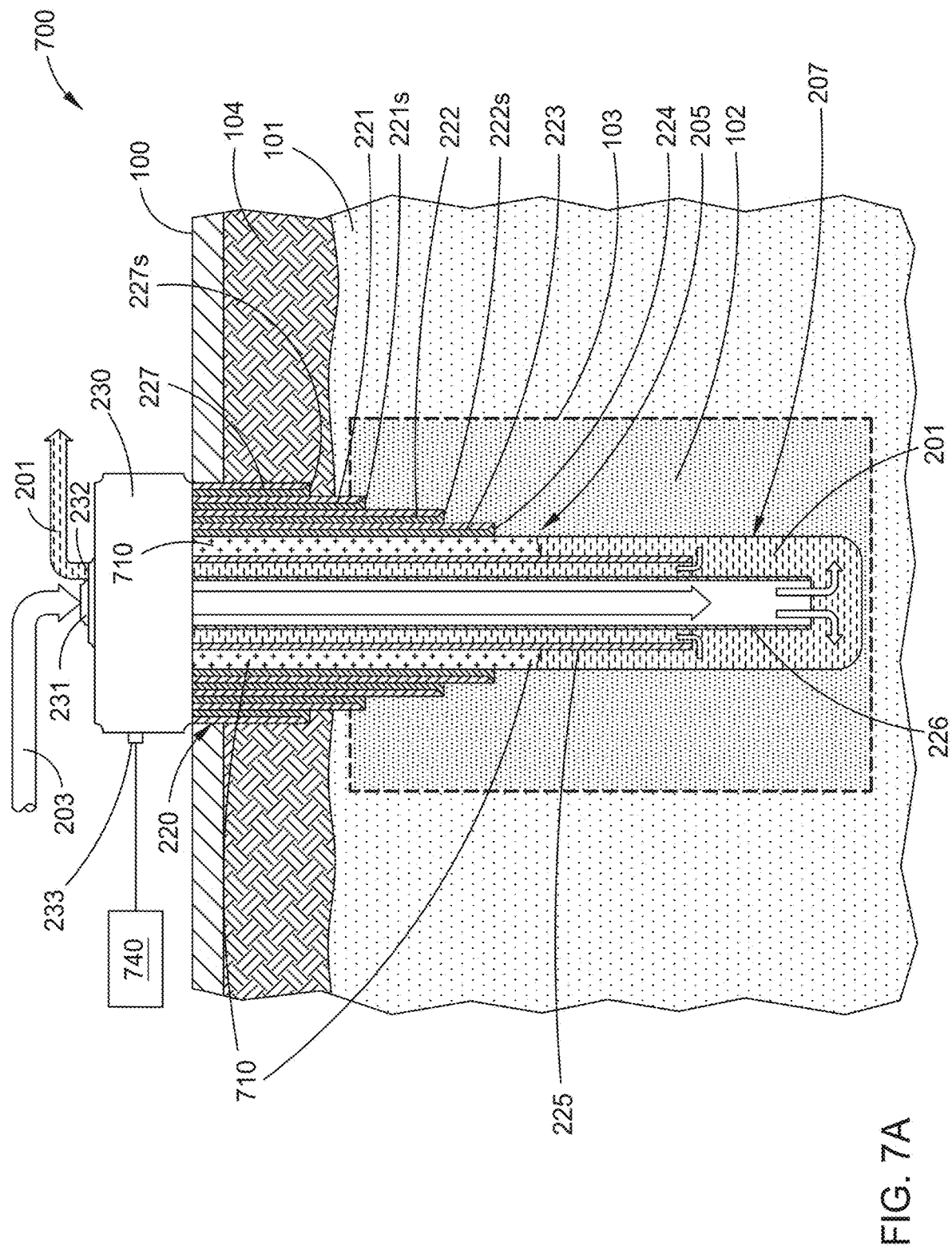
FIG. 7A illustrates a cavern system with a cavern formed within a salt formation having a first volumetric size using a first blanket, according to one or more embodiments of the present disclosure.
Figure 7B:
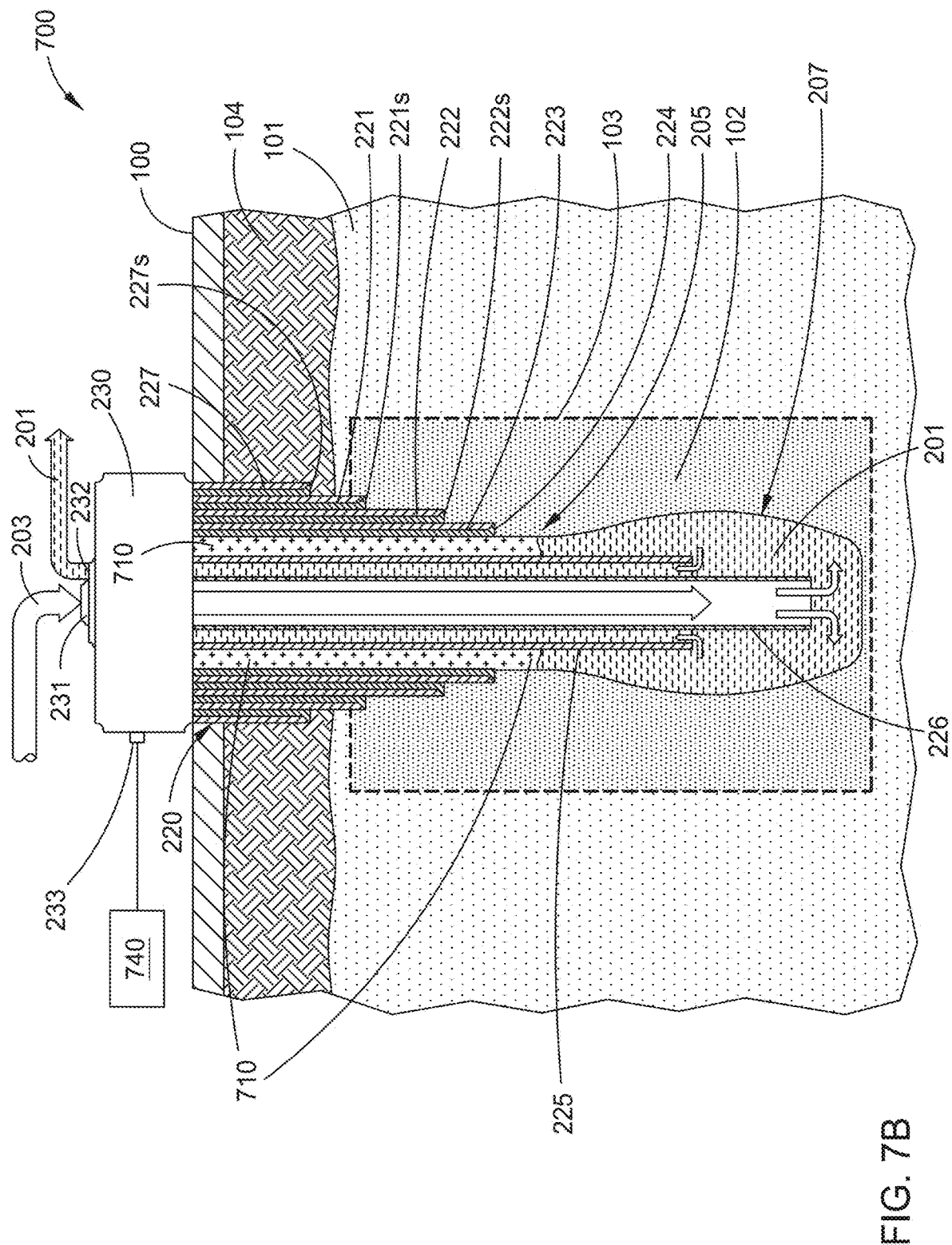
FIG. 7B illustrates the cavern system with the cavern having been expanded to a second volumetric size from the first volumetric size, according to one or more embodiments of the present disclosure.
Figure 7C:
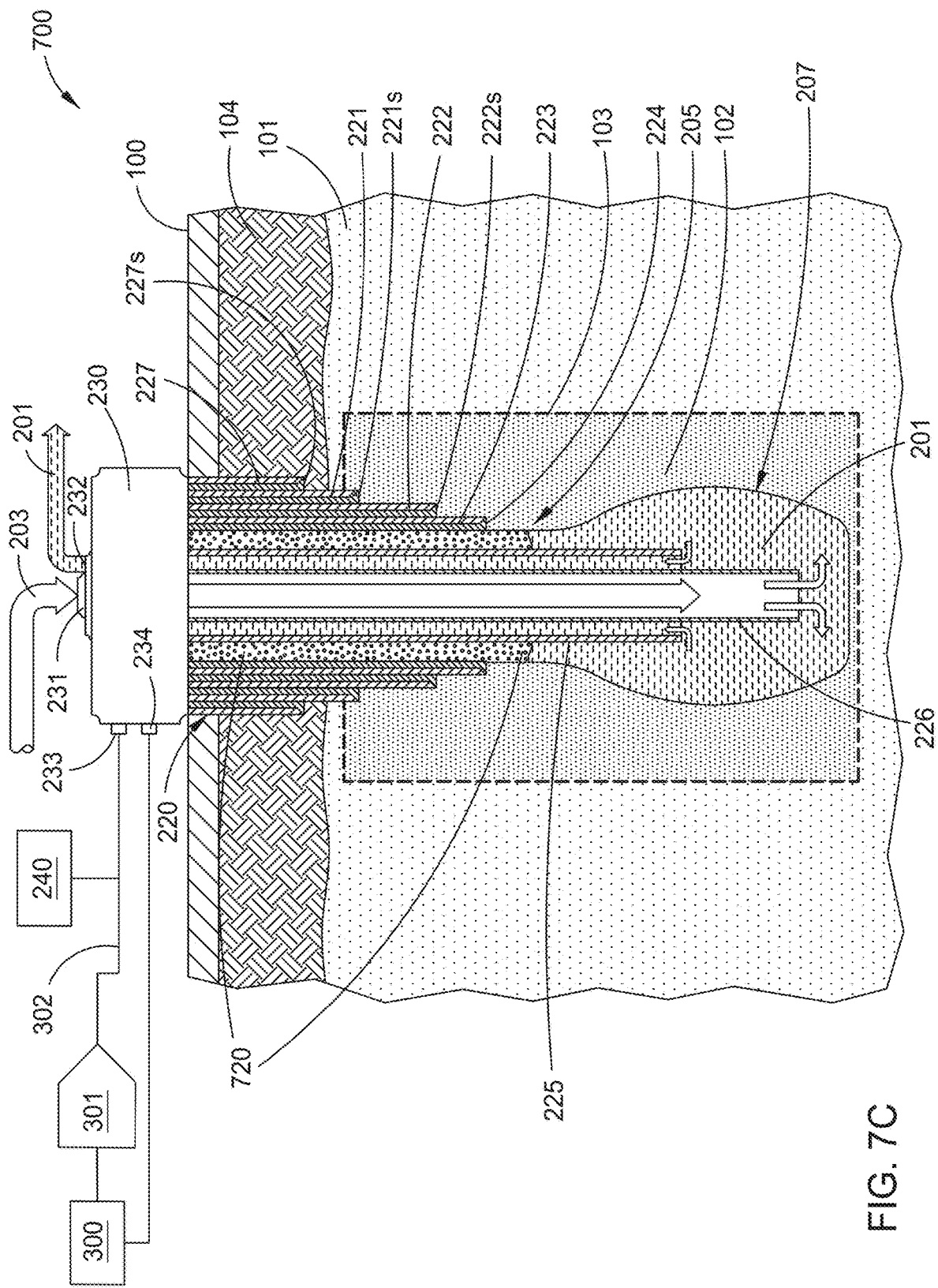
FIG. 7C illustrates the cavern system with the cavern having been expanded to a third volumetric size from the third volumetric size using a second blanket, according to one or more embodiments of the present disclosure.

FIGS. 7A-7C illustrate a cavern system 700 in which cavern 207 is solution mined to a minimum viable cavern size using a first blanket 710 comprised of a first blanket material and then transitioning to a hydrogen blanket (e.g., second blanket) to expand the cavern 207 while commercially storing hydrogen gas within the cavern 207. As shown in FIGS. 7A-7B, the cavern 207 is solution mined from a first size (e.g., first volume), such as the schematic first size being shown in FIG. 7A, to a minimum viable cavern size (e.g., minimum viable volume) shown in FIG. 7B with the first blanket 710 in place. As shown in FIGS. 7B-7C, the cavern 207 is further expanded from the minimum viable cavern size shown in FIG. 7B to a third size (e.g., third volume) as shown in FIG. 7C with a hydrogen blanket 720 in place. The cavern system 700 has similar components and features as cavern system 200 (as indicated by the reference signs without reciting the description of these components and features, for brevity). In some embodiments, the cavern system 700 includes the string assembly 220 configured such that the first casing shoe 221s is set in the cap rock 104 above the salt formation 101, whereas the second casing shoe 222s and the third casing shoe 224 are set within the salt formation 101. In some embodiments, the cavern system 700 includes four casing strings with shoes (such as shoes 611, 622, 633, and 644) each set within the salt formation 101.

As shown in FIG. 7A, solvent 203 is injected into the wellhead 230 and into the cavern 207 to dissolve the salt within the predetermined cylindrical region 102. The resulting brine 201 is retrieved to the surface. A first blanket material is injected into the wellhead 230 through a port, such as the third port 233, to maintain the first blanket 710 to protect the area around the third casing shoe 224 during the solution mining process and also to protect the cavern 207 from creeping in on itself. The first blanket material is a gaseous material. For example, the first blanket material may be nitrogen gas, a noble gas, air, or other suitable gas. The first blanket material may be injected from a first blanket material gas supply 740, such as being hauled in trucks.

In some embodiments, the first blanket material of the first blanket 710 is selected based on price and logistics of transporting the material to the cavern site. For example, the hydrogen pipeline 300 may be in the process of being built while the cavern 207 is being constructed to the minimum viable cavern size. Another material, such as nitrogen gas, may be more cost effective to transport to the cavern site to be used as the blanket until a stable supply of hydrogen is available. The first blanket material is also selected based on contamination and/or cost of decontamination. For example, the first blanket material may be selected because it is readily removable from hydrogen retrieved from the cavern or removable from the cavern in a cost-effective manner as the hydrogen is substituted as the blanket.

In some embodiments, the first blanket 710 is introduced into the cavern when solution mining begins. In other words, the first blanket 710 can be used when expanding the cavern from an initial size (e.g., small void in salt that is used to start expanding the cavern) to the minimum viable cavern size. Thus, the first size of the cavern may be the initial size of the cavern. In some embodiments, the first blanket 710 is introduced after the cavern 207 is expanded from an initial size to a larger size to facilitate further expansion of the cavern 207.

FIG. 7B illustrates the cavern 207 after reaching the minimum viable cavern size. The first blanket 710 may be used during the mechanical integrity testing. Once the cavern 207 is declared ready for commercial storage, the first blanket material is replaced with hydrogen gas. In other words, a hydrogen blanket 720 (shown in FIG. 7C) is substituted for the first blanket 710 to facilitate further expansion of the cavern 207 and to facilitate storage of hydrogen gas within the cavern 207 during expansion. In some embodiments, the substitution for hydrogen gas may occur prior to further solution mining. In some embodiments, the hydrogen blanket 720 is substituted for the first blanket 710 prior to performing the mechanical integrity test, such as the hydrogen blanket 720 being used during the mechanical integrity test. The hydrogen gas may be injected through a port in the wellhead 230, such as the third port 233. In some embodiments, the first blanket material and the hydrogen gas may be injected through different ports. The first blanket material may be removed from the cavern 207 through the same port in the wellhead 230 that the first blanket material is injected into or a different port. The hydrogen pipeline 300 and compressor 301 may be connected to the wellhead 230 to facilitate the injection of hydrogen during the substitution of the blankets.

FIG. 7C illustrates the cavern system 700 with the hydrogen blanket 720 that was substituted for the first blanket 710. Additional solution mining of the cavern 207 may then occur using the hydrogen blanket 720. As shown, the hydrogen blanket 720 is maintained by connecting a hydrogen source to the third port 233, such as connecting a hydrogen compressor 301 that compresses hydrogen gas supplied from a pipeline 300 to the wellhead 230. The first blanket material gas supply 740 may be disconnected from the wellhead 230 as part of changing the cavern system 700 from the first blanket 710 to the hydrogen blanket 720.

In some embodiments, the hydrogen blanket 720 may be substituted for the first blanket material prior to reaching the minimum viable cavern size. For example, the hydrogen blanket 720 may be introduced when a stable supply of hydrogen, such as the hydrogen pipeline 300, has been completed and can deliver hydrogen to the wellhead 230.

In some embodiments, the hydrogen blanket 720 may be substituted for the first blanket material after being expanded from the minimum viable cavern size. For example, a commercially viable hydrogen source may not be connected to the cavern site when the integrity test is passed and the relevant regulatory authority permits the cavern for hydrogen storage. Solution mining can continue to occur to expand the cavern 207 with the first blanket material until a hydrogen source is available to be used as the hydrogen blanket 720.

In some embodiments, solution mining after the cavern 207 has entered service includes injecting solvent 203 while simultaneously injecting the blanket material. In some embodiments, solution mining after the cavern 207 has entered service does not include the simultaneous injection of the blanket material and the solvent 203. In other words, either the solvent 203 or the blanket material is injected into the wellhead 230 at one time.

In some embodiments, a system for storing hydrogen product in a cavern while creating additional capacity within the cavern includes a predetermined cylindrical region within a salt formation defining the outer boundary for hydrogen product storage. The system further includes a cavern within the predetermined cylindrical region for hydrogen product storage. The system further includes a casing shoe providing fluidic communication between the surface and the cavern. The casing shoe facilitates: injection of raw water into the cavern; recovering brine from the cavern; injecting hydrogen product into the cavern; and recovering hydrogen product from the cavern. The cavern contains hydrogen product forming a protective blanket in an upper part of the cavern. An exemplary cavern is a salt cavern.

In some embodiments, a method for storing hydrogen product in a cavern while creating additional capacity within the cavern includes determining a cylindrical region within a salt formation; installing a casing shoe within the geological salt formation; solution mining within the predetermined cylindrical region to create a cavern that contains brine; compressing hydrogen product to produce a compressed hydrogen product; introducing the compressed hydrogen product into the cavern to produce stored hydrogen within the cavern to partially displace the brine; maintaining a predetermined minimum quantity of stored hydrogen within the cavern and the predetermined cylindrical region below an upper pressure limit at the casing shoe, using the sufficiently impermeable barrier that exists within the predetermined cylindrical region and the maximum pressure at the casing shoe to maintain the structural integrity of the cavern; placing the cavern into commercial hydrogen storage service, and thereafter introducing fresh water into the cavern while the cavern also contains stored hydrogen to enlarge the cavern within the predetermined cylindrical region. An exemplary cavern is a salt cavern.

In some embodiments, a method for storing hydrogen product in a cavern using a predetermined cylindrical region within the salt formation as the sufficiently impermeable barrier, includes determining a cylindrical region within a salt formation; removing a salt core sample from the boundary of the predetermined cylindrical region and testing the salt core sample in a laboratory to ascertain the porosity and permeability of the salt under ambient temperature and pressure conditions as well as under the geostatic pressure and temperature conditions that exist along the boundaries of the predetermined cylindrical region to confirm the existence of the sufficiently impermeable barrier within the predetermined cylindrical region; determining a minimum quantity of hydrogen that must be contained within the predetermined cylindrical region based upon the cavern's volume and the porosity of the salt inside the predetermined cylindrical region; utilizing the existence of the sufficiently impermeable barrier within the predetermined cylindrical region to ensure that the minimum quantity of hydrogen is always contained within the predetermined cylindrical region of the cavern. An exemplary cavern is a salt cavern.

In some embodiments, a method for storing hydrogen product in a salt cavern includes determining a cylindrical region within a salt formation; installing a casing shoe within the geological salt formation; solution mining a salt cavern within the predetermined cylindrical region; removing hydrogen product from a hydrogen pipeline; compressing the hydrogen product to produce a compressed hydrogen product; introducing the compressed hydrogen product into a salt cavern that has been solution-mined within the predetermined cylindrical region to produce stored hydrogen within the salt cavern; maintaining a predetermined minimum quantity of stored hydrogen within the salt cavern and the predetermined cylindrical region below an upper pressure limit at the casing shoe, using the sufficiently impermeable barrier that exists within the predetermined cylindrical region and the maximum pressure at the casing shoe to maintain the structural integrity of the roof and neck of the salt cavern and to maintain the structural integrity of the predetermined cylindrical region. An exemplary cavern is a salt cavern.

In some embodiments, however, the pressure of the hydrogen, rather than the minimum quantity of hydrogen required within a predetermined region of the salt formation, is used to monitor and maintain the hydrogen blanket. For example, hydrogen can be injected or released based on the pressure within the cavern obtained by one or more pressure sensors, such as injecting additional hydrogen into the cavern if the pressure drops below a threshold that risks the integrity of the cavern. An exemplary cavern is a salt cavern.

It is contemplated that any one or more elements or features of any one disclosed embodiment or example may be beneficially incorporated in any one or more other non-mutually exclusive embodiments or examples. While the foregoing is directed to embodiments of the present disclosure, other and further embodiments of the disclosure may be devised without departing from the basic scope thereof, and the scope thereof is determined by the claims that follow.

What is claimed is:

1. A method of operating a cavern in a salt formation, the method comprising:
   performing a first mining operation to expand the cavern from a first volume to a second volume, the first mining operation including:
      injecting a first solvent into a first inlet of a wellhead and through a first flow path of a tubular string to dissolve a first portion of the salt formation to form a first brine; and
      pumping the first brine out a first outlet of the wellhead via a second flow path of the tubular string;
   performing a mechanical integrity test of the cavern after performing the first mining operation; and
   injecting a predetermined quantity of hydrogen gas into the cavern after performing the mechanical integrity test, wherein:
      the predetermined quantity of hydrogen gas is equivalent to a factor multiplied by a base volume that is fillable by hydrogen gas; and
      the base volume includes a volume within the salt formation that is fillable by hydrogen gas, a volume of the cavern above a brine interface, and a volume of a third flow path of the tubular string.

2. The method of claim 1, further comprising:
   performing a second mining operation to expand the cavern from the second volume to a third volume, the second mining operation including:
      injecting a second solvent into the cavern to further dissolve a second portion of the salt formation to form a second brine; and
      pumping the second brine out of the cavern via the second flow path.

3. The method of claim 2, further comprising maintaining the predetermined quantity of hydrogen gas within the cavern during the second mining operation by injecting hydrogen gas through a second inlet in the wellhead.

4. The method of claim 3, further comprising injecting the hydrogen gas through the second inlet in the wellhead while injecting the second solvent into the first inlet of the wellhead.

5. The method of claim 3, wherein the predetermined quantity of hydrogen gas increases during the second mining operation.

6. The method of claim 1, further comprising:
removing a portion of the hydrogen gas from the cavern to reduce a pressure of the hydrogen gas at the wellhead to about 0 psig, wherein removing the portion of the hydrogen gas includes reducing a total quantity of hydrogen gas in the cavern to below the predetermined quantity of hydrogen gas.

7. The method of claim 6, further comprising:
injecting additional hydrogen gas into the cavern such that the total quantity of hydrogen gas in the cavern is increased to greater than or equal to the predetermined quantity of hydrogen gas after removing the portion of the hydrogen gas to reduce the pressure of the hydrogen gas at the wellhead to about 0 psig.

8. The method of claim 1, further comprising:
obtaining one or more cores from a predetermined region of the salt formation before performing the first mining operation;
analyzing the one or more cores to determine a porosity of the salt formation within the predetermined region; and
determining the predetermined quantity of hydrogen gas based on the porosity.

9. The method of claim 1, wherein the predetermined quantity of hydrogen gas is one of a predetermined volume of hydrogen gas or a predetermined mass of hydrogen gas.

10. A method of operating a cavern in a salt formation, comprising:
performing a first mining operation to expand the cavern from a first volume to a second volume, the first mining operation including:
injecting a first solvent into a first inlet of a wellhead and through a first flow path of a tubular string to dissolve a first portion of a salt formation to form a first brine; and
pumping the first brine out a first outlet of the wellhead via a second flow path of the tubular string;
maintaining a first blanket within the cavern during the first mining operation by injecting a first gas into the cavern;
performing a mechanical integrity test of the cavern after performing the first mining operation;
performing a second mining operation to expand the cavern from the second volume to a third volume, the second mining operation including:
injecting a second solvent into the cavern to dissolve a second portion of the salt formation to form a second brine; and
pumping the second brine out of the cavern via the second flow path; and
maintaining a hydrogen blanket within the cavern during the second mining operation by injecting at least a predetermined quantity of hydrogen gas into the cavern through a second inlet in the wellhead and into a third flow path of the tubular string, wherein:
the predetermined quantity of hydrogen gas is equivalent to a factor multiplied by a base volume that is fillable by hydrogen gas; and
the base volume includes a volume within the salt formation that is fillable by hydrogen gas, a volume of the cavern above a brine interface, and a volume of the third flow path of the tubular string.

11. The method of claim 10, wherein the predetermined quantity of hydrogen gas is based on a porosity of the salt formation, and includes a quantity of the hydrogen gas that is estimated to seep into the salt formation.

12. The method of claim 10, wherein the predetermined quantity of hydrogen gas is one of a predetermined volume of hydrogen gas or a predetermined mass of hydrogen gas.

13. The method of claim 10, further comprising removing a portion of the hydrogen gas from the cavern while maintaining at least the predetermined quantity of hydrogen gas within the cavern.

14. The method of claim 10, wherein at least a portion of the hydrogen gas injected into the cavern is received from a pipeline.

15. The method of claim 10, wherein the first gas includes a noble gas.

16. The method of claim 10, further comprising:
compressing hydrogen gas received from a hydrogen gas pipeline with a compressor at a cavern site to supply the hydrogen gas for the hydrogen blanket.

17. The method of claim 1, further comprising:
estimating a deformation of the cavern caused by removing a portion of the hydrogen gas disposed within the cavern to reduce a pressure of the hydrogen gas within the cavern from a first pressure to a second pressure;
comparing the estimated deformation to a deformation threshold;
determining that the estimated deformation does not exceed the deformation threshold; and
removing, for a first time, the portion of the hydrogen gas from the cavern after determining that the estimated deformation does not exceed the deformation threshold.

18. The method of claim 17, wherein removing the portion of the hydrogen gas from the cavern includes reducing the pressure of the hydrogen gas within the cavern to 0 psig.

19. The method of claim 17, wherein the second pressure is about 0 psig.

20. The method of claim 17, further comprising determining a time period until the estimated deformation exceeds the deformation threshold.

21. The method of claim 20, further comprising injecting additional hydrogen gas into the cavern within the time period after removing the portion of the hydrogen gas from the cavern.

22. The method of claim 21, wherein the additional hydrogen gas is injected until at least a predetermined amount of hydrogen gas is present within the cavern to resist deformation of the cavern.

23. The method of claim 21, further comprising removing hydrogen gas from the cavern a second time after the injecting the additional hydrogen gas into the cavern.

24. The method of claim 21, further comprising expanding a size of the cavern by solution mining the cavern while using the additional hydrogen gas as a blanket.

25. The method of claim 17, further comprising injecting water into the cavern while removing the portion of the hydrogen gas from the cavern.

* * * * *